United States Patent [19]
Thomas

[11] Patent Number: 5,943,231
[45] Date of Patent: Aug. 24, 1999

[54] COMPUTER CONTROLLED SEPARATOR DEVICE

[75] Inventor: James A. Thomas, Rocky Ford, Colo.

[73] Assignee: Oliver Manufacturing Co., Inc., Rocky Ford, Colo.

[21] Appl. No.: 08/684,046

[22] Filed: Jul. 22, 1996

Related U.S. Application Data

[63] Continuation of application No. 08/047,025, Apr. 16, 1993, Pat. No. 5,541,831.

[51] Int. Cl.$^6$ ........................................ B03B 4/00
[52] U.S. Cl. ......................... 364/148; 209/489; 209/491; 209/552
[58] Field of Search ..................... 364/148–152; 209/489, 491, 492, 496, 500, 501, 504, 508, 552, 580

[56] References Cited

U.S. PATENT DOCUMENTS

| | | | |
|---|---|---|---|
| 3,933,249 | 1/1976 | Welsh et al. ............................... | 209/75 |
| 4,278,536 | 7/1981 | Weiffen ..................................... | 209/422 |
| 4,282,091 | 8/1981 | Carter, Sr. .................................. | 209/467 |
| 4,316,799 | 2/1982 | Satake ....................................... | 209/504 |
| 4,342,654 | 8/1982 | Lambert ................................... | 210/744 |
| 4,563,271 | 1/1986 | Schroder et al. ......................... | 209/427 |
| 4,765,489 | 8/1988 | Satake ....................................... | 209/557 |
| 4,793,918 | 12/1988 | Thomas ..................................... | 209/467 |
| 4,991,721 | 2/1991 | Misra et al. .............................. | 209/31 |
| 5,024,334 | 6/1991 | Misra et al. ............................. | 209/557 |
| 5,148,922 | 9/1992 | Marriott ................................... | 209/503 |
| 5,541,831 | 7/1996 | Thomas ..................................... | 364/148 |

*Primary Examiner*—Paul P. Gordon
*Assistant Examiner*—Thomas E. Brown
*Attorney, Agent, or Firm*—Banner & Witcoff

[57] ABSTRACT computer controlled separator device is disclosed. The computer control system monitors the operation of the separator device and makes any adjustments necessary to maintain optimal operation. An operator may input values representing desired operating parameters and/or desired product characteristics of the separator device. Alternatively, these values may be programmed into the computer control system in accordance with optimal product or system standards. The computer control system monitors the operation of the separator device and makes any adjustments necessary to maintain operation in accordance with the selected or programmed values. Specifically, the computer control system may monitor incoming and outgoing product characteristics, i.e. particle weight, particle density, or particle size; and/or operating parameters, i.e. air flow, vibration speed, side tilt, end raise, feed rate, divider knife position and cutout gate position. In response to monitoring signals, operating parameters of the separator device are adjusted.

21 Claims, 22 Drawing Sheets

FIG. 9

0 INDICATES NO CHANGE
+ INDICATES IMPROVEMENT IN QUALITY AS INPUT FROM SENSORS
+ INDICATES INCREASE IN ADJUSTMENT OF DEVICE PARAMETER
- INDICATES REDUCTION OF QUALITY AS INPUT FROM SENSORS
- INDICATES DECREASE IN ADJUSTMENT OF DEVICE PARAMETER
+- INDICATES INCREASE TOWARD POSITIVE, DECREASE TOWARD NEGATIVE
-+ INDICATES DECREASE TOWARD NEGATIVE, INCREASE TOWARD POSITIVE

| SENSOR INPUT | | | | COMPUTER OUTPUT TO ADJUST DEVICE PARAMETERS | | | | | | | | | | | |
|---|---|---|---|---|---|---|---|---|---|---|---|---|---|---|---|
| FEED | HEAVY | MIDDLE | LIGHT | CUTOUT | HFRAC | MFRAC | LFRAC | FRATE | SLOPE | TILT | RPM | AIR 1 | AIR 2 | AIR 3 | AIR 4 | AIR 5 |
| FD | HV | MD | LT | CG | HF | MF | LF | FR | S | T | R | A1 | A2 | A3 | A4 | A5 |
| 0 | 0 | 0 | 0 | 0 | 0 | 0 | 0 | 0 | 0 | 0 | 0 | 0 | 0 | 0 | 0 | 0 |
| 0 | 0 | 0 | + | 0 | 0 | + | - | 0 | 0 | 0 | 0 | 0 | 0 | 0 | 0 | 0 |
| 0 | 0 | 0 | - | 0 | 0 | - | + | 0 | 0 | 0 | 0 | 0 | 0 | 0 | 0 | 0 |
| 0 | 0 | + | 0 | 0 | + | - | 0 | 0 | 0 | 0 | 0 | 0 | 0 | 0 | 0 | 0 |
| 0 | 0 | + | + | 0 | + | -+ | - | 0 | 0 | 0 | 0 | 0 | 0 | 0 | 0 | 0 |
| 0 | 0 | + | - | 0 | + | - | + | 0 | 0 | 0 | 0 | 0 | 0 | 0 | 0 | 0 |
| 0 | 0 | - | 0 | 0 | 0 | + | - | 0 | 0 | 0 | 0 | 0 | 0 | 0 | 0 | 0 |
| 0 | 0 | - | + | 0 | 0 | + | - | 0 | 0 | 0 | 0 | 0 | 0 | 0 | 0 | 0 |
| 0 | 0 | - | - | 0 | 0 | - | + | 0 | 0 | 0 | 0 | 0 | 0 | 0 | 0 | 0 |
| 0 | + | 0 | 0 | + | + | - | 0 | 0 | 0 | - | + | + | 0 | 0 | 0 | 0 |
| 0 | + | 0 | + | + | + | -+ | - | 0 | 0 | - | + | + | 0 | 0 | 0 | 0 |
| 0 | + | 0 | - | + | + | - | + | 0 | 0 | - | + | + | 0 | 0 | 0 | 0 |
| 0 | + | + | 0 | + | + | - | 0 | + | + | - | + | + | 0 | 0 | 0 | 0 |
| 0 | + | + | + | + | + | -+ | - | + | + | - | + | + | 0 | 0 | 0 | 0 |
| 0 | + | + | - | + | + | - | + | + | + | - | + | + | 0 | 0 | 0 | 0 |
| 0 | + | - | 0 | 0 | 0 | + | - | 0 | 0 | - | + | + | 0 | 0 | 0 | 0 |
| 0 | + | - | + | 0 | 0 | + | - | 0 | 0 | - | + | + | 0 | 0 | 0 | 0 |
| 0 | + | - | - | 0 | 0 | - | + | 0 | 0 | - | + | + | 0 | 0 | 0 | 0 |
| 0 | - | 0 | 0 | - | - | + | 0 | 0 | 0 | 0 | 0 | - | 0 | 0 | 0 | 0 |
| 0 | - | 0 | + | - | - | + | - | 0 | 0 | 0 | 0 | - | 0 | 0 | 0 | 0 |
| 0 | - | 0 | - | - | - | +- | + | 0 | 0 | 0 | 0 | - | 0 | 0 | 0 | 0 |
| 0 | - | + | 0 | - | - | + | 0 | 0 | 0 | 0 | 0 | - | 0 | 0 | 0 | 0 |
| 0 | - | + | + | - | - | + | - | 0 | 0 | 0 | 0 | - | 0 | 0 | 0 | 0 |
| 0 | - | + | - | - | - | - | + | 0 | 0 | 0 | 0 | - | 0 | 0 | 0 | 0 |
| 0 | - | - | 0 | - | - | ++ | - | - | - | + | - | - | 0 | 0 | 0 | 0 |
| 0 | - | - | + | - | - | -+ | - | - | - | + | - | - | 0 | 0 | 0 | 0 |
| 0 | - | - | - | - | - | -- | + | - | - | + | - | - | 0 | 0 | 0 | 0 |

FIG. 10

0 INDICATES NO CHANGE
+ INDICATES IMPROVEMENT IN QUALITY AS INPUT FROM SENSORS
+ INDICATES INCREASE IN ADJUSTMENT OF DEVICE PARAMETER
- INDICATES REDUCTION OF QUALITY AS INPUT FROM SENSORS
- INDICATES DECREASE IN ADJUSTMENT OF DEVICE PARAMETER
+- INDICATES INCREASE TOWARD POSITIVE, DECREASE TOWARD NEGATIVE
-+ INDICATES DECREASE TOWARD NEGATIVE, INCREASE TOWARD POSITIVE

| SENSOR INPUT | | | | COMPUTER OUTPUT TO ADJUST DEVICE PARAMETERS | | | | | | | | | | | | |
|---|---|---|---|---|---|---|---|---|---|---|---|---|---|---|---|---|
| FEED | HEAVY | MIDDLE | LIGHT | CUTOUT | HFRAC | MFRAC | LFRAC | FRATE | SLOPE | TILT | RPM | AIR 1 | AIR 2 | AIR 3 | AIR 4 | AIR 5 |
| FD | HV | MD | LT | CG | HF | MF | LF | FR | S | T | R | A1 | A2 | A3 | A4 | A5 |
| + | 0 | 0 | 0 | + | + | - | 0 | + | + | 0 | 0 | + | 0 | 0 | 0 | 0 |
| + | 0 | 0 | + | + | + | -+ | - | + | + | 0 | 0 | + | 0 | 0 | 0 | 0 |
| + | 0 | 0 | - | + | + | -- | + | + | + | 0 | 0 | + | 0 | 0 | 0 | 0 |
| + | 0 | + | 0 | + | + | - | 0 | + | + | 0 | 0 | + | 0 | 0 | 0 | 0 |
| + | 0 | + | + | + | + | -+ | - | + | + | 0 | 0 | + | 0 | 0 | 0 | 0 |
| + | 0 | + | - | + | + | -- | + | + | + | 0 | 0 | + | 0 | 0 | 0 | 0 |
| + | 0 | - | 0 | 0 | 0 | + | - | 0 | 0 | 0 | 0 | + | 0 | 0 | 0 | 0 |
| + | 0 | - | + | 0 | 0 | + | - | 0 | 0 | 0 | 0 | + | 0 | 0 | 0 | 0 |
| + | 0 | - | - | 0 | 0 | - | + | 0 | 0 | 0 | 0 | + | 0 | 0 | 0 | 0 |
| + | + | 0 | 0 | + | + | - | 0 | + | + | - | + | + | 0 | 0 | 0 | 0 |
| + | + | 0 | + | + | + | -+ | - | + | + | - | + | + | 0 | 0 | 0 | 0 |
| + | + | 0 | - | + | + | - | + | + | + | - | + | + | 0 | 0 | 0 | 0 |
| + | + | + | 0 | + | + | - | 0 | + | + | - | + | + | 0 | 0 | 0 | 0 |
| + | + | + | + | + | + | -+ | - | + | + | - | + | + | 0 | 0 | 0 | 0 |
| + | + | + | - | + | + | -- | + | + | + | - | + | + | 0 | 0 | 0 | 0 |
| + | + | - | 0 | + | 0 | + | - | + | + | - | + | + | 0 | 0 | 0 | 0 |
| + | + | - | + | + | 0 | + | - | + | + | - | + | + | 0 | 0 | 0 | 0 |
| + | + | - | - | + | 0 | - | + | + | + | - | + | + | 0 | 0 | 0 | 0 |
| + | - | 0 | 0 | 0 | - | + | 0 | - | - | + | - | 0 | 0 | 0 | 0 | 0 |
| + | - | 0 | + | 0 | - | ++ | - | - | - | + | - | 0 | 0 | 0 | 0 | 0 |
| + | - | 0 | - | 0 | - | +- | + | - | - | + | - | 0 | 0 | 0 | 0 | 0 |
| + | - | + | 0 | 0 | - | + | 0 | - | - | + | - | 0 | 0 | 0 | 0 | 0 |
| + | - | + | + | 0 | - | ++ | - | - | - | + | - | 0 | 0 | 0 | 0 | 0 |
| + | - | + | - | 0 | - | +- | + | - | - | + | - | 0 | 0 | 0 | 0 | 0 |
| + | - | - | 0 | 0 | - | ++ | - | - | - | + | - | 0 | 0 | 0 | 0 | 0 |
| + | - | - | + | 0 | - | ++ | - | - | - | + | - | 0 | 0 | 0 | 0 | 0 |
| + | - | - | - | 0 | - | +- | + | - | - | + | - | 0 | 0 | 0 | 0 | 0 |

FIG. 11

0 INDICATES NO CHANGE
+ INDICATES IMPROVEMENT IN QUALITY AS INPUT FROM SENSORS
+ INDICATES INCREASE IN ADJUSTMENT OF DEVICE PARAMETER
- INDICATES REDUCTION OF QUALITY AS INPUT FROM SENSORS
- INDICATES DECREASE IN ADJUSTMENT OF DEVICE PARAMETER
+- INDICATES INCREASE TOWARD POSITIVE, DECREASE TOWARD NEGATIVE
-+ INDICATES DECREASE TOWARD NEGATIVE, INCREASE TOWARD POSITIVE

| SENSOR INPUT | | | | COMPUTER OUTPUT TO ADJUST DEVICE PARAMETERS | | | | | | | | | | | | |
|---|---|---|---|---|---|---|---|---|---|---|---|---|---|---|---|---|
| FEED | HEAVY | MIDDLE | LIGHT | CUTOUT | HFRAC | MFRAC | LFRAC | FRATE | SLOPE | TILT | RPM | AIR 1 | AIR 2 | AIR 3 | AIR 4 | AIR 5 |
| FD | HV | MD | LT | CG | HF | MF | LF | FR | S | T | R | A1 | A2 | A3 | A4 | A5 |
| - | 0 | 0 | 0 | - | 0 | 0 | 0 | - | - | 0 | 0 | - | 0 | 0 | 0 | 0 |
| - | 0 | 0 | + | - | 0 | + | - | - | - | 0 | 0 | - | 0 | 0 | 0 | 0 |
| - | 0 | 0 | - | - | 0 | - | + | - | - | 0 | 0 | - | 0 | 0 | 0 | 0 |
| - | 0 | + | 0 | - | + | - | 0 | - | - | 0 | 0 | - | 0 | 0 | 0 | 0 |
| - | 0 | + | + | - | + | -+ | - | - | - | 0 | 0 | - | 0 | 0 | 0 | 0 |
| - | 0 | + | - | - | + | -- | + | - | - | 0 | 0 | - | 0 | 0 | 0 | 0 |
| - | 0 | - | 0 | - | 0 | + | - | - | - | 0 | 0 | - | 0 | 0 | 0 | 0 |
| - | 0 | - | + | - | 0 | + | - | - | - | 0 | 0 | - | 0 | 0 | 0 | 0 |
| - | 0 | - | - | - | 0 | - | + | - | - | 0 | 0 | - | 0 | 0 | 0 | 0 |
| - | + | 0 | 0 | - | + | - | 0 | 0 | 0 | - | + | 0 | 0 | 0 | 0 | 0 |
| - | + | 0 | + | - | + | -+ | - | 0 | 0 | - | + | 0 | 0 | 0 | 0 | 0 |
| - | + | 0 | - | - | + | -- | + | 0 | 0 | - | + | 0 | 0 | 0 | 0 | 0 |
| - | + | + | 0 | 0 | + | - | 0 | 0 | 0 | - | + | 0 | 0 | 0 | 0 | 0 |
| - | + | + | + | 0 | + | -+ | - | 0 | 0 | - | + | 0 | 0 | 0 | 0 | 0 |
| - | + | + | - | 0 | + | -- | + | 0 | 0 | - | + | 0 | 0 | 0 | 0 | 0 |
| - | + | - | 0 | - | + | -+ | - | 0 | 0 | - | + | 0 | 0 | 0 | 0 | 0 |
| - | + | - | + | - | + | -+ | - | 0 | 0 | - | + | 0 | 0 | 0 | 0 | 0 |
| - | + | - | - | - | + | +- | + | 0 | 0 | - | + | 0 | 0 | 0 | 0 | 0 |
| - | - | 0 | 0 | - | - | + | 0 | - | - | + | - | - | 0 | 0 | 0 | 0 |
| - | - | 0 | + | - | - | ++ | - | - | - | + | - | - | 0 | 0 | 0 | 0 |
| - | - | 0 | - | - | - | +- | + | - | - | + | - | - | 0 | 0 | 0 | 0 |
| - | - | + | 0 | - | - | + | 0 | - | - | + | - | - | 0 | 0 | 0 | 0 |
| - | - | + | + | - | - | ++ | - | - | - | + | - | - | 0 | 0 | 0 | 0 |
| - | - | + | - | - | - | +- | + | - | - | + | - | - | 0 | 0 | 0 | 0 |
| - | - | - | 0 | - | - | ++ | - | - | - | + | - | - | 0 | 0 | 0 | 0 |
| - | - | - | + | - | - | ++ | - | - | - | + | - | - | 0 | 0 | 0 | 0 |
| - | - | - | - | - | - | +- | + | - | - | + | - | - | 0 | 0 | 0 | 0 |

# COMPUTER CONTROLLED SEPARATOR DEVICE

This is a continuation of application Ser. No. 08/047,025, filed Apr. 16, 1993 now U.S. Pat. No. 5,541,831.

BACKGROUND OF THE INVENTION

1. Field of the Invention

The present invention is generally directed to the field of particulate material separating devices, and more particularly, to a computer controlled separator device for separating dry, granular, free-flowing material according to particle density.

2. Description of the Related Art

Conventional gravity separator devices use an inclined perforated separator deck, which is vibrated, in combination with an air flow directed vertically upwards through the separator deck in order to separate material into fractions or sections by weight. Typically, gravity separator devices are used to improve product quality in seed and grain, mineral, and recycling applications. The inlet end of the deck is elevated with respect to the outlet end to define an end raise. End raise is adjusted to control the rate at which material flows over the deck. A first side of the deck is elevated with respect to a second side to define a side tilt. Side tilt is adjusted to control the rate at which heavier material is conveyed up hill on the deck. By supplying vertically moving air, a lifting action is created that acts upon each particle in the bed of a product to be separated. The air flow also results in a vigorous washing effect whereby fine dust and dirt is removed from the product to be separated.

The separator deck is vibrated to provide an agitation and a conveying action. With each vibration stroke, the agitation action lifts the bed of material and throws it up into the air flow. In general, the air flow velocity is set at a value that is an average of that required to lift the bed of material. This value is lower than the terminal velocity of the particles so that, when lifted by the agitation action, all particles will fall back toward the deck surface against the air flow. The rate of fall is related to the weight of the particle and to the aerodynamic nature of the particle. Each individual particle varies from an average particle mass to some degree. In accordance with the degree of variance, heavier particles fall faster against the air flow and lighter particles fall slower against the air flow. When the bed of material has been subjected to a few lifting and falling cycles, stratified layers are generated, with the lightest material being on top of the bed and the most dense material collecting on the bottom of the bed. Intermediate particles having characteristics close to the average characteristics of the mass of the product are located in middle zones between the heaviest and lightest particles.

In addition to the agitation action, the vibration of the separator bed provides a conveying action. The conveying action imparts a thrust to the particles as they are lifted and thrown into the air. The deck surface retracts while the particles are in the air, and advances as the particles fall back to the deck surface. Heavier particles that are on the bottom of the bed are situated in closer contact with the deck surface, and are conveyed at a faster rate than lighter particles that are at the top of the bed. The deck surface is tilted in a direction opposite to the conveying action provided by the vibration. Lighter material that is on top of the bed is not affected as much by the conveying action, and tends to flow downhill in the direction of the side tilt.

With proper adjustment of air flow, separator bed vibration speed, and separator bed side tilt and end raise, a bed of material may be effectively separated. Denser particles on the bottom of the bed move uphill in one direction because of the vibrating conveying action. Lighter particles on the top of the bed flow downhill in an opposite direction because of the agitation action and side tilt. Intermediate particles move at a speed and in a direction that is directly related to the weight and aerodynamic qualities of the particles.

One technique for adjusting the end raise and side tilt in a gravity separator device is disclosed in U.S. Pat. No. 2,759,605 to Steele, wherein two screw jacks are used to accomplish these adjustments. A major disadvantage with this type of adjustment assembly is the need to release and secure clamps before and after adjustments are made. Another disadvantage is that the machine must be stopped in order to allow the operator to make any adjustments. This can be both time consuming and costly since any down-time takes away from productive separating time.

Another technique is shown in U.S. Pat. No. 5,024,334 to Misra et al., in which a detector detects the movement of control particles with respect to a gravity table in order to control a separation process. A disadvantage to this technique is that control particles must be added, thereby introducing unwanted impurities into the product to be separated.

In another device, shown in U.S. Pat. No. 4,563,271 to Schroder et al., a percussion jig has a carrier for material to be separated. In the discharge regulation system that supplies the separated materials to different outlets, a float generates a signal, which is used to control the discharge gate at the output.

U.S. Pat. No. 4,342,654 to Lambert discloses a separator having a liquid-filled tank with sensors to detect the level of separation of two layers in the bed of the separator. In response to the sensor signals, the system adjusts a solenoid valve to control the air venting process of the separator. U.S. Pat. No. 4,991,721 to Misra et al. shows sensing of the quantity of undersized material separated by a screen and of the quantity of oversized material separated by an air-lift to effect adjustments to the screen or air-lift.

Other prior art techniques, such as those described by U.S. Pat. No. 4,765,489 to Satake and U.S. Pat. No. 3,933,249 to Welsh et al., use light sensitive elements to monitor the product output from a product separator, and move a product recovering device in response to changes in product output.

SUMMARY OF THE INVENTION

It is an object of the present invention to provide a computer interface with a high-capacity separator device to improve efficiency and ease of operation.

It is a further object of the present invention to automate operator functions of a separator device in order to make more efficient use of production resources.

It is a further object of the present invention to provide a computer controlled separator device, in which the computer control system controls the functions of the separating device required for optimum performance.

It is yet another object of the present invention to provide a computer control system to monitor the operating parameters of a separating device and hold preset conditions indefinitely, automatically making adjustments to those parameters if changes in the operating environment, such as air pressure, temperature and humidity, so necessitate.

It is another object to provide a gravity separator control device that will store and record operating parameters for future use.

It is still another object of the present invention to provide a computer controlled separator device capable of monitoring the characteristics of the input material or output material, and which adjusts operating parameters accordingly to maintain a given standard of product quality.

It is a further object of the invention to provide a computer controlled separator device that will monitor final product quality and will :adjust operating parameters to maintain reject product below certain levels and maintain acceptable product above certain levels.

It is another object to provide a computer controlled separator device that will monitor the final product to keep product that must be recycled to a minimum.

It is another object of the present invention to provide a computer controlled separator device that will monitor operating parameters an product quality and that will warn an operator when preset values are not maintained.

It is still a further object of the present invention to provide a computer controlled separator device that can be interfaced with other devices in a processing line of equipment.

The present invention is directed to a computer controlled separator device for separating heavier particulate material from lighter particulate material. The control system monitors the operation of the separator device and makes any adjustments necessary to maintain desired optimal operation.

According to the present invention, the operator may input values representing desired operating parameters and/ or desired product: characteristics of the separator device. Alternatively, these values may be programmed into the computer control system in accordance with optimal product or system standards. The computer control system monitors the operation of the separator device and makes any adjustments necessary to maintain operation in accordance with the selected or programmed values. Specifically, the computer control system may monitor incoming and outgoing product characteristics, i.e. particle weight, particle density, or particle size; and/or operating parameters, i.e. air flow, vibration speed, side tilt, end raise, feed rate divider knife position and cutout gate position. In response to monitoring signals, operating parameters of the separator device are adjusted. Thus, sensors provide product or operating information to the computer control system. The computer control system then processes the information, makes decisions based upon the current values of the information as compared to input or programmed values, and adjusts separator device operating parameters if necessary.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2b is a top view of the separator deck of the gravity separator of FIG. 2a;

FIG. 9 is a truth table showing an example of operating parameter control according to the present invention;

FIG. 10 is another truth table showing an example of operating parameter control according to the present invention;

FIG. 11 is another truth table showing; an example of operating parameter control according to the present invention.

DETAILED DESCRIPTION OF THE PREFERRED EMBODIMENTS

A particulate material separating device having computer control will now be described. Although the preferred embodiment of the present invention is described herein with respect to a gravity separator device, it is to be understood that the present invention encompasses other types of particulate separator devices, such as stoners and the like.

Figure 1:
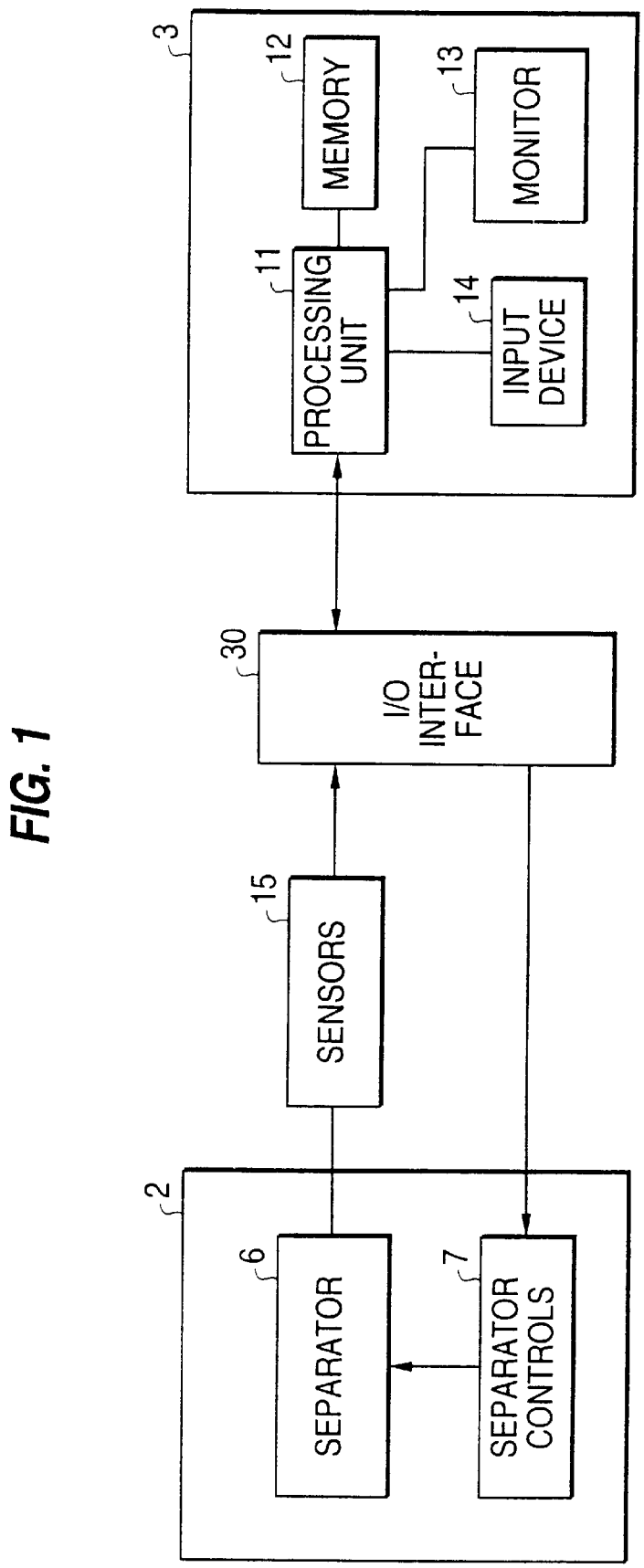
FIG. 1 is a system block diagram of the computer controlled gravity separator device according to the present invention.

FIG. 1 is a system block diagram of a computer controlled gravity separator device in accordance with the present invention. The computer controlled gravity separator device includes separator device 2 including separator 6 and separator controls 7, computer control system 3, sensors 15, and I/O interface 30.

Figure 2A:
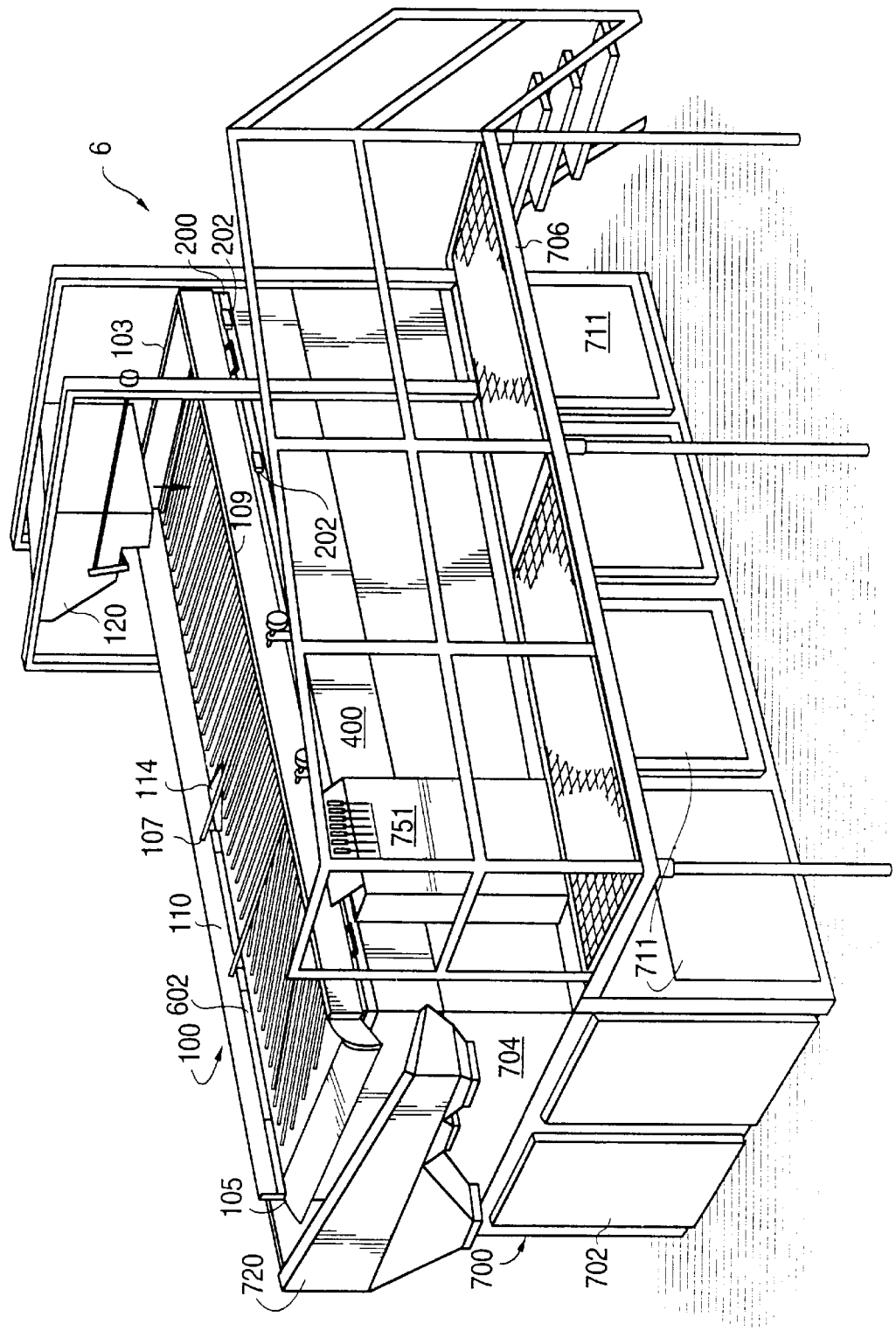
FIG. 2a is a front perspective view of a preferred gravity separator of the computer controlled separator device according to the present invention.

Separator 6 is generally illustrated in FIG. 2a and includes a support framework or housing 700 that supports the entire separator device 5 on the ground. Framework 703 includes a lower section 702, an upper section 704, and an operator stand 706. A perforated separator deck 100 is supported for vibratory motion by a suspension assembly in upper section 704 of framework 700. Ribbon feeder 120 supplies particulate material to be separated to deck 100 at an adjustable rate determined in accordance with operator control. A first end 103 of the deck 100 is elevated with respect to the other end 105 of deck 100 to define an end raise and a first side 107 of the deck 100 is elevated with respect to a second side 109 of the deck to define a side tilt. An end raise adjustment mechanism (not shown) adjusts the end raise and a side tilt adjustment mechanism (not shown) adjusts the side tilt during the separating operation. A drive assembly (not shown), such as an eccentric drive assembly, is coupled to the suspension assembly to supply vibratory motion to separator deck 100. An upward air flow through separator deck 100 is provided by a plurality of fans supported inside lower section 702 of framework 700. The fans are mounted on a common drive shaft and are driven by a single motor to operate at the same speed. Each fan supplies air to a particular area of separator deck 100 and each fan may be independently adjusted. Independent fine air adjustment may be controlled, for example, by a opening and closing baffles or air gates. Adjustments of end raise, side tilt, vibration speed, and air flow may be accomplished through the use of hydraulics, as is known in the art. A preferred separator and the controls to adjust the above-identified operating parameters are described in detail in commonly assigned U.S. Pat. No. 4,793,918, which is incorporated herein by reference.

The particulate material supplied to deck 100 is separated according to weight by the vibratory action of deck 100 and the air flow therethrough. Specifically, the combined action of the vibration of separator deck 100 and the upward flow of air through deck 100 forces lighter material to the top of the bed of material on deck 100 and the heavier material sinks to the bottom, i.e., vertical stratification. The horizontal component of the vibration or agitation thereafter further enhances separation by conveying the heavier material toward the uphill side of deck 100. The net effect of the agitated deck, the sloping deck surface and the controlled air flow converts the vertically stratified bed of material into a horizontal separation which varies form the heaviest particles at the high side of the surface ranging down to the lightest particles located at the lowest point of the deck surface. Concurrently, with the horizontal stratification, all the material is being conveyed downhill from the high inlet end 103 to discharge hopper 720 at the low outlet end 105. Discharge hopper 720 collects the graded materials and divides it into two or three fractions, for example, heavy, middle, and light for final discharge from the machine.

Figure 2B:
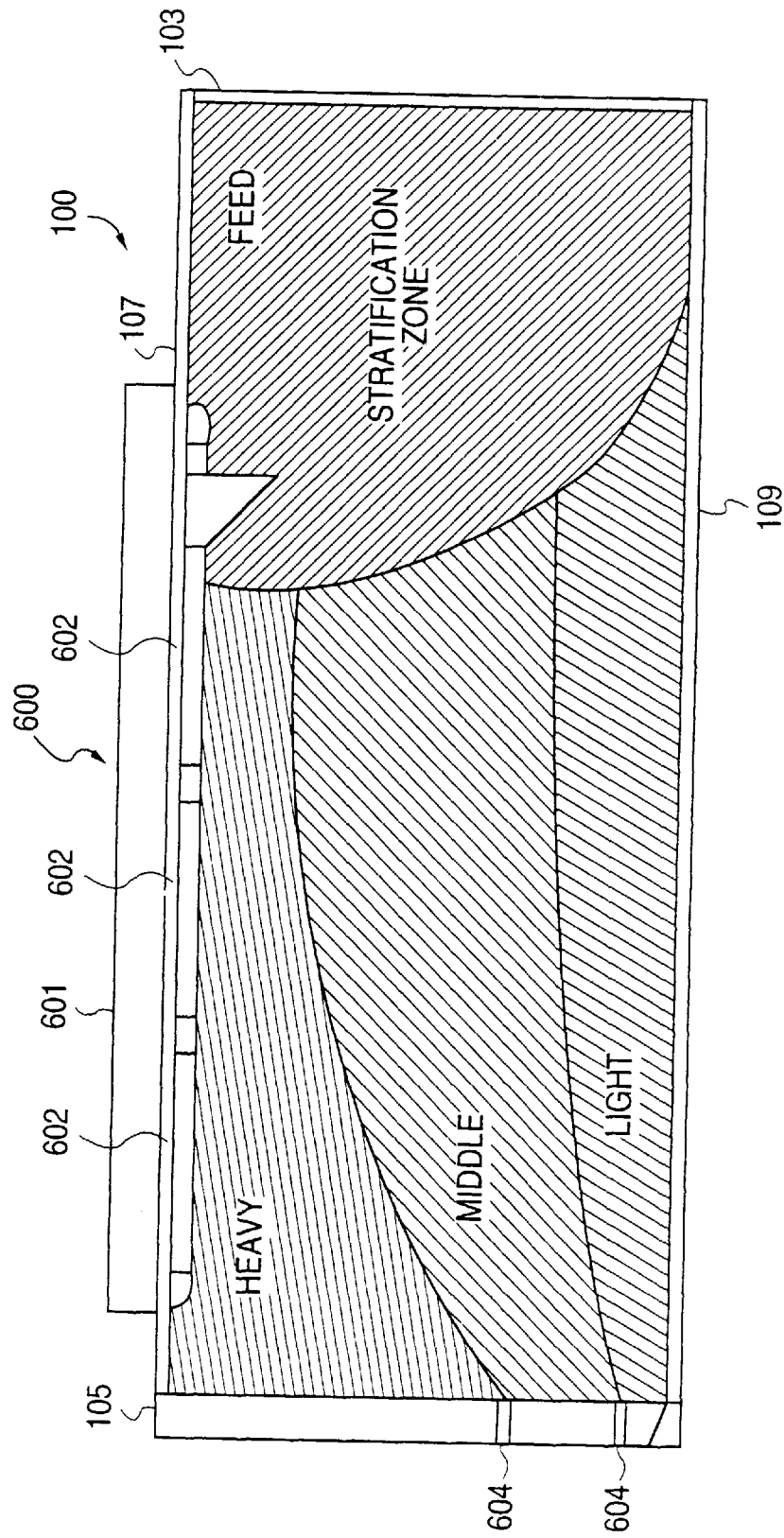

FIG. 2b shows a typical flow pattern of material on deck 100. Material is stratified close to the feeder, at high inlet end 103. During separation, material is divided into three fractions, referred to as heavy, middle and light. Separated material is discharged from low outlet end 105 and/or through cutout gates 602 into blender 600. Low outlet end 105 is provided with divider knives 604, which are adjustable to divide material flow and direct it into proper spouts of discharge hopper 720. The adjustment of divider knives 604 determines the cutoff for any fraction of material. For example, in FIG. 2b, moving the divider knife between the middle and light fractions up would result in a greater percentage of material being discharged as light grade material and a lesser percentage of material being discharged as middle grade material.

Material may also be discharged through blender 600, which allows for a more efficient recovery of heavy material from the high side 107 of deck 100. Blender 600 is mounted for vibratory motion on framework 700 and includes trough 601 and cutout gates 602. Cutout gates 602 are pivotable to vary one or more openings along side 107 and control the amount of material accepted by trough 601 of blender 600. The more material accepted, the faster the separation time can be and faster separation tire allows for a shorter deck. Opening cutout gates 602 wider allows heavy material to be discharged into the blender sooner, and is advantageous when separation is relatively easy and heavy material is desirable. Restricting the opening of cutout gates 602 keeps material on deck 100 longer, increasing separation time and accuracy and is advantageous when middle or light material is desirable. Once separated material is received in trough 601 it is conveyed to discharge hopper 720 by vibratory motion. The adjustment of divider knives 604 and cutout gates 602 may be accomplished hydraulically or electrically.

Referring to FIG. 1, computer control system 3 includes a processing unit 11, a memory 12, a monitoring device 13, and an input device 14. Suitable input devices may be, for example, a keyboard, light pen, joystick or trackball. One example of a suitable computer control system is an IBM compatible 386 computers which is widely used and readily available. Processing Unit 11 includes appropriate interface software to process input signals from sensors 15 via I/O interface 30 and output signals to separator controls 7 via I/O interface 30.

I/O interface 30 receives command output signals from the processing unit 11 of computer control system 10, converts the output signals into voltage or current supplies and sends the output power to separator controls 7 of separator device 5. I/O interface 30 receives inputs from sensors 15 located at various positions with respect to the gravity separator system, converts these inputs into signals that processing unit 11 can recognize, and sends the signals to processing unit 11. A suitable I/O interface module is the I/O PAK unit, produced by Action Instruments. It will be appreciated that many commercially available I/O modules are also suitable for use in the present invention. Since I/O modules have a given number of inputs and outputs, additional I/O units may be stacked to obtain a total number of inputs or outputs required for the control of a particular gravity separator system.

Sensors 15 are located so as to effectively monitor operating parameters (i.e. air flow, vibration sped, side tilt, end raise, feed rate, divider knife position, cutout gate position and feed bin levels) and/or product quality characteristics (i.e. particle weight, density and size). The arrangement of sensors 15 will be discussed with reference to FIGS. 3–8.

In a preferred embodiment, computer control system 3 is programmed to compare input data from sensors 15 to either preset or user input values. In accordance with the comparison, control signals are output to separator controls 7 in order to adjust operating parameters. In addition, the operator may, at any time, make a change in desired preset values, record this change in the memory 12, and computer control system 3 holds the new preset values indefinitely, or returns to the originally programmed values if the newly programmed values do not provide satisfactory results. Further, computer control system 3 may record current operating parameters and store these values for future reference. Upon startup at a later date, stored values may be utilized to automatically adjust separator device 2 to operate according to the previously stored values. Computer control system 3 may also, if desired, provide a record of operating parameters via printer 40, and provide a display of current operating parameters on monitor 13.

As discussed above, the air flow in separator device 2 directly affects the separation process. Changes in the ambient temperature, barometric pressure and humidity will effect air density and flow. Since air is the weighing medium for gravity separations, ambient air changes affect the separation process. Thus, the monitoring and control of air flow according to the present invention greatly improves the separation process and is accomplished as follows.

Figure 3:
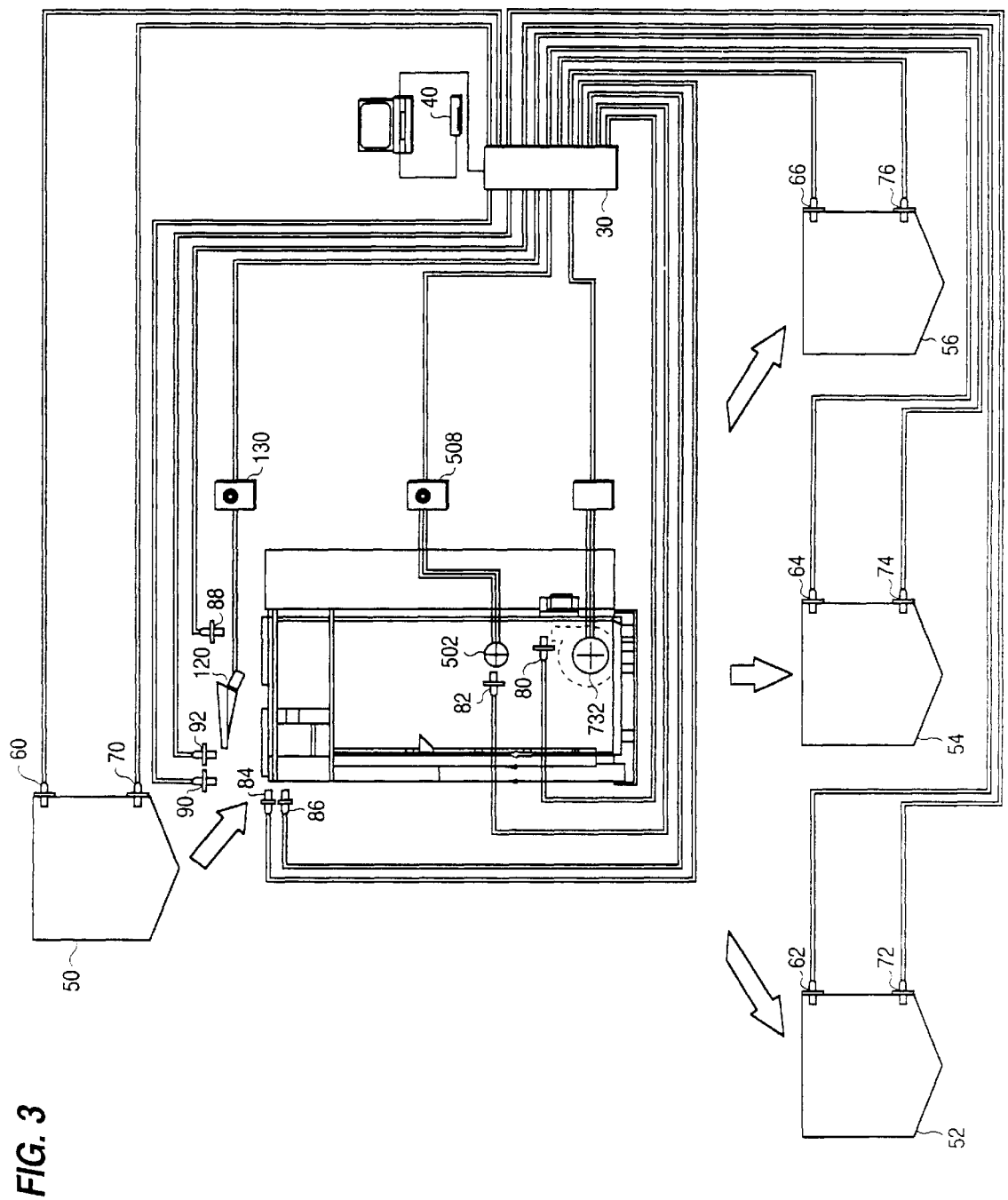
FIG. 3 is schematic view illustrating one mode of operation of the computer controlled separator device according to the present invention.
Figure 7:
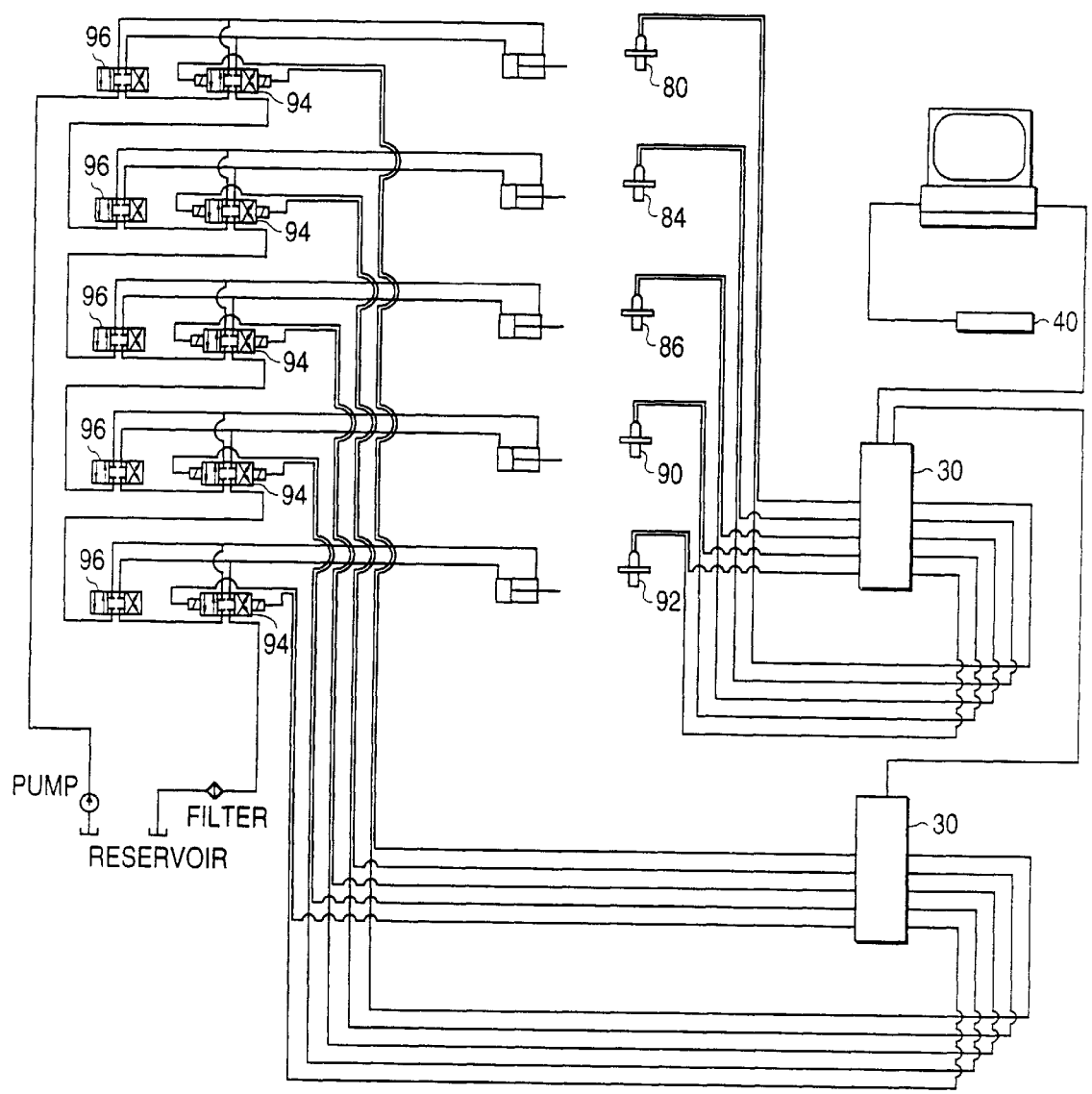
FIG. 7 is a schematic view illustrating, hydraulic control according to the present invention.

With reference to FIGS. 3 and 7, air pressure is monitored by a sensor 80, positioned at the outlet of a fan 732. Although sensor 80 may be positioned elsewhere, location near the outlet of fan 732 reduces the effect of outside factors that may affect the accuracy of the air pressure measurement, such as barometric pressure, temperature, humidity, wind velocity and direction, adjacent equipment, air conditioning, and other environmental factors. By locating sensor 80 at the outlet of the blower, minute variations in the ambient conditions, which effect air flow, can accurately be detected as variations in air pressure, and can be used to control the system. Alternatively, if separator device 2 is equipped with a plurality of fans, the plurality of fans could be monitored and controlled simultaneously with one sensor 80 or, alternatively, separately monitored and controlled via a plurality of sensors (not shown).

Sensor 80 may be any suitable pressure sensor known in the art. For example, a pitot tube connected to a pressure gauge that indicates pressure by the measurement of a rising column of liquid may be used. Alternatively, a differential pressure transmitter such as a Dwyer Series 60, 604 or 605 may be used. The pressure sensor chosen is dependent upon the range of pressures expected to be encountered in the typical operation of separator system, which may, in turn, depend upon the type of material to be separated.

Pressure sensor 80 generates an output current proportional to a sensed pressure. The output current is supplied to I/O interface 30, which converts the output current from an analog signal to a digital signal suitable for processing unit 11. The digital signal representing the sensed pressure is then compared by processing unit 11 to a preset value stored in memory 12, or to a value that has been input by an operator via input device 14. In accordance with this comparison, processing unit 11 outputs a signal to I/O interface 30, which is converted by I/O interface 30 to a control signal appropriate to control the speed of the fan motor 732. In addition, as shown diagrammatically in FIG. 7, and as explained in more detail below, I/O interface 30 may further generate control signals to independently control the fine adjustment of a plurality of fans via the control of a plurality of hydraulic jacks.

Figure 4:
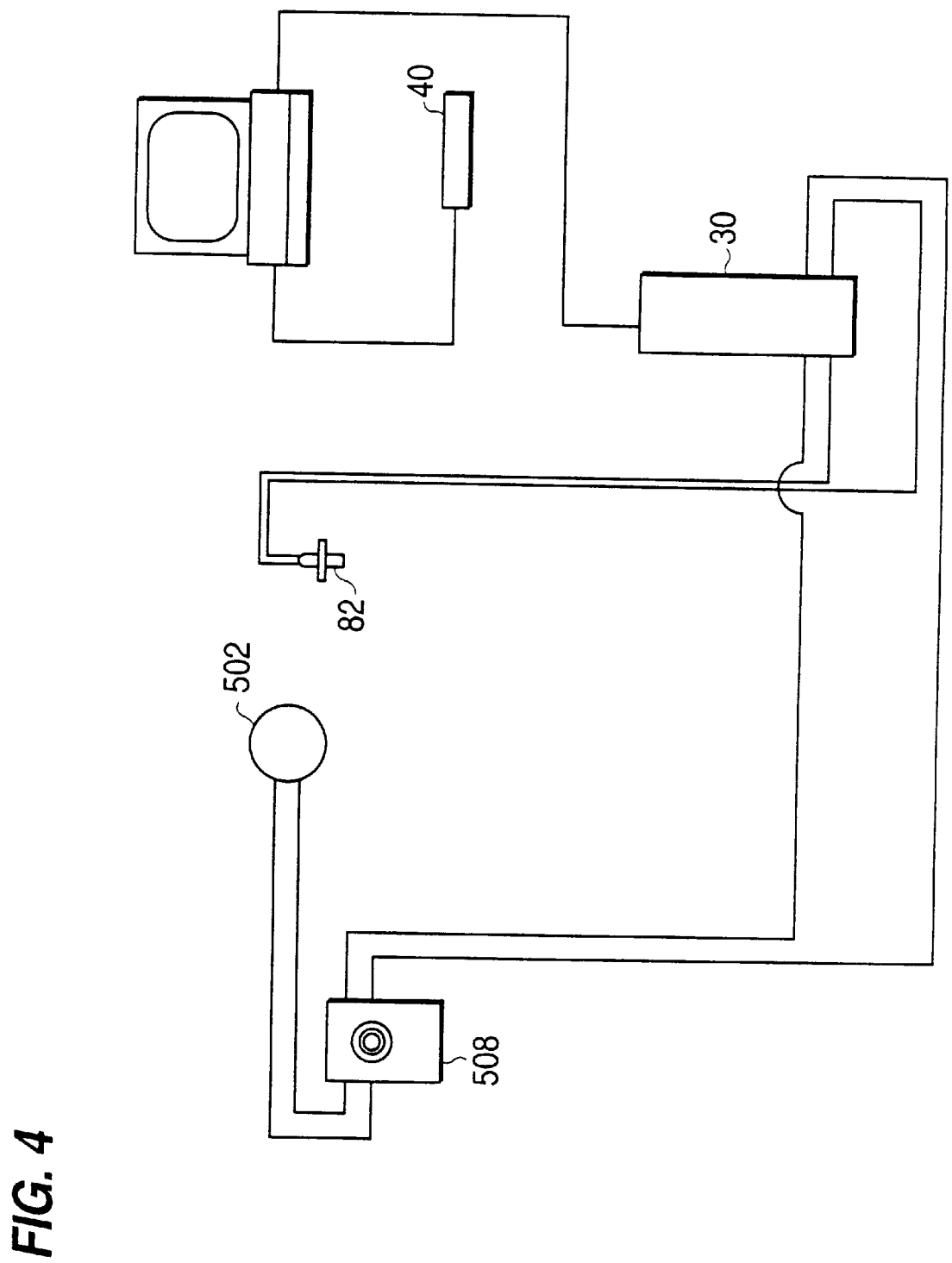
FIG. 4 is a schematic view showing the monitoring and control of vibration speed according to the present invention.

Sensor 82, as illustrated in FIGS. 3 and 4, monitors the speed of the eccentric motor 502 for vibrating the separator deck. Sensor 82 may be a digital counter, including a sprocket or gear, mounted on the rotatable shaft of the eccentric motor. A magnetic sensor is mounted such that when the sprocket turns, each tooth of the sprocket passes within the sensing range of the sensor, generating a magnetic pulse. This magnetic pulse generates a current in a wire attached to a counter. The counter counts the number of pulses in a set time period and converts this to a DC current output, which is directly related to the number of pulses per time period. Alternatively, a rotary position indicating switch, such as a model 17SXX switch, available from Proximity Controls, Inc., may be used to monitor motor speed.

The output current from sensor 82 is input to I/O interface 30, which converts the analog signal to a digital signal suitable for processing unit 11. The digital signal, representative of the actual speed of vibration, is compared by processing unit 11 with a preset value stored in memory 12, or to a value that has been input by an operator via input device 14. In accordance with this comparison, processing unit 11 outputs a signal to I/O interface 30, which is converted by I/O interface 30 to a signal appropriate to increase or decrease the speed of the eccentric motor 502 via motor speed controller 508.

The eccentric motor used may be of the fixed RPM, variable ratio sheave type, such as model 6500 X 7/8, produced by Maury. In this type of eccentric motor, a fixed RPM motor is mounted on a moveable base. A hydraulic cylinder is actuated by control signals from computer control system 10 to move the motor. The motor drives a shaft that is connected to an eccentric mechanism, which vibrates the deck surface. The motor is connected to the eccentric shaft via a V-belt and two sheaves. One sheave has a fixed diameter and the other has a variable diameter. As the center distance between the motor shaft and the eccentric is varied, a corresponding variation is caused in the variable diameter sheave. Increasing the center distance between the two sheaves causes a reduction of the effective diameter of the variable diameter sheave and results in a reduction of speed. Decreasing the center distance between the two shafts results in a larger effective diameter of the variable diameter sheave and an increase in speed. In operation, computer control system 3 compares the actual speed with the preset or operator input speed and issues correction signals, if necessary. The correction signal is a short pulse that activates the hydraulic cylinder in the desired direction. After issuing a correction pulse, computer control system 3 waits for a predetermined time period to allow for the mechanical adjustment to be made, and then performs another comparison. An appropriate time period for speed control adjustment was found to be approximately $1/100$ second.

Alternatively, depending upon the desires of the user, a motor may be used of the variable RPM, fixed ratio belt drive type. In this arrangement, computer control system 3 generates a signal for a controller which varies the speed of the eccentric motor. A suitable controller is the Allen Bradley 1331 Adjustable Frequency Controller No. 134965. The eccentric motor is connected to the eccentric shaft via a V-belt and two fixed diameter sheaves. As the speed of the motor is varied there is a corresponding variation in the speed of the eccentric shaft. This method is simpler to install than the fixed RPM, variable ratio sheave type, but costs much more due to the high cost of the electronic motor control. Computer control system 3 compares the actual operating speed of the motor with a preset or operator input speed. If there is a difference between the actual speed and the preset or operator input speed, computer control system 10 increases or decreases the value of an output to I/O interface 30 accordingly. At I/O interface 30, the output of computer control system 10 is converted to an appropriate control signal. The control signal is supplied to the motor controller which increases or decreases the frequency of the 3 phase AC power to the motor. This produces a corresponding change in the motor RPM.

Sensor 84, illustrated in FIGS. 3 and 7, monitors the side tilt of separator 6. In operation, separator 6 is adjusted so that heavier material climbs a sloping surface and lighter material flows downhill on the same surface. The direction of side tilt is perpendicular to the direction of flow of product on the deck and is parallel to the direction of vibration. The optimum setting of side tilt is as steep as possible to make the lighter material flow downhill while allowing all of the denser heavy material to climb up the slope. If the slope is too steep, the heavy material will not climb uphill; if the slope is too flat, the lighter material will not flow downhill.

Sensor 84 for measuring side tilt may be one of several mechanical measurement devices. For example, an inclinometer can be used to measure the tilt angle from the horizontal. Alternatively, a linear transducer may be used to measure the position of a location on the deck as compared to a fixed location of the machine. The transducer outputs a signal indicative of position, based on the resistance of a length of wire in the transducer. The transducer is connected between the fixed location and the position on the deck with a mechanical linkage and has a nearly linear output relative to the position of the deck. Alternatively, a potentiometer may be connected between the separator deck and the suspension assembly. Changes in the side tilt of the deck surface cause a corresponding change in the linkage, resulting in a rotation of the potentiometer. The potentiometer is subject to less wear than the linear transducer because much of the vibration can be absorbed by proper placement of the connecting linkage.

An optical position indicator, which emits a light ray from a source to a target, may also be utilized. The ray is reflected back to the source and gives a linear signal proportional to the distance of the target. An ultrasonic position indicator may also be used, and similarly provides a linear output signal relative to the side tilt of the deck. Various other sensors could be used to measure side tilt. Suitable sensors are manufactured by Tri-Tronics and Senix.

The output signal from sensor 84 is input to I/O interface 30, which converts the analog signal to a digital signal suitable for processing unit 11. The digital signal representative of the sensed side tilt is compared by processing unit 11 with a value stored in memory 12 or to a value that has been input by an operator via input device 14. In accordance with this comparison, if a correction is needed, computer control system 3 outputs a signal to I/O interface 30, which converts the signal to a control signal appropriate to actuate the hydraulic jack controlling the side tilt. After sending the signal, computer control system 3 waits for a predetermined time period to allow the mechanical action to stabilize. Then, computer control system 3 makes another comparison and issues a further correction signal, if needed.

Sensor 86, illustrated in FIGS. 3 and 7, monitors the end raise of separator 6. Adjustment of the end raise changes the slope of the deck away from the feed area. Increasing the end raise causes the product to flow faster and move away from the feed area. A greater end raise is required at high capacity than at low capacity. End raise is parallel to the direction of flow of product on the deck and is perpendicular to the direction of vibration. Relative to the deck surface, end raise is at right angles to side tilt.

Sensor 86 for sensing end raise may be an inclinometer, a linear transducer, a potentiometer, an optical position indicator, or an ultrasonic position indicator similar to those discussed above with respect to sensor 84 for sensing side tilt. It is noted that the range of adjustment is generally greater for end raise than for side tilt. End tilt is measured and controlled in a similar manner as side tilt as described above. Control signals actuate the hydraulic jack controlling end raise.

Sensor 88 senses the rate at which material is fed to separator 6. Feed rate control will now be described for a separator device that uses a rotary feeder (FIG. 5) and a separator device that uses a vibratory feeder FIG. 6).

Figure 5:
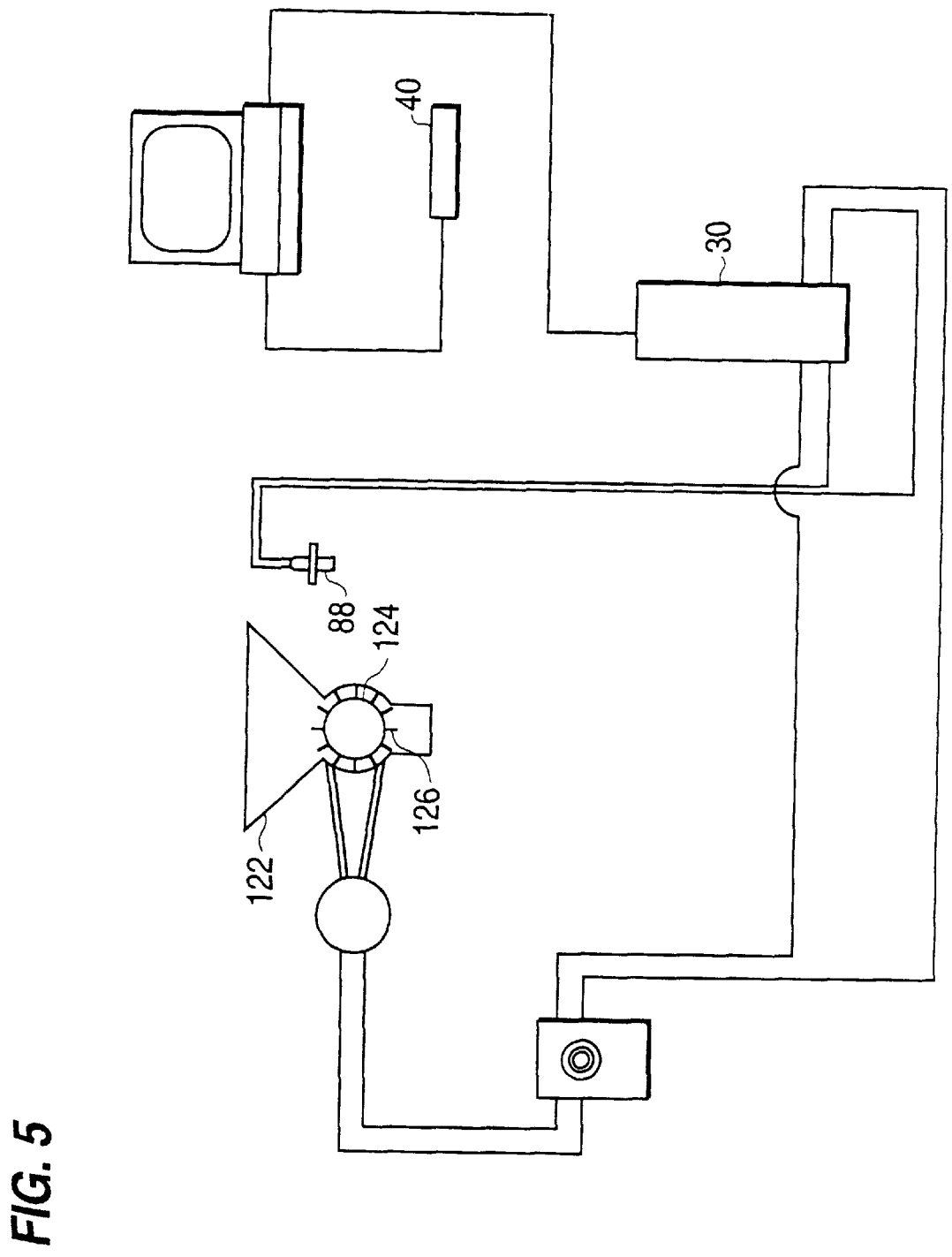
FIG. 5 is a schematic view showing the monitoring and control of one type of feeder according to the present invention.

Referring to FIG. 5, rotary feeder 122 includes a drum 124 with a series of paddles 126 spaced around the periphery thereof. The displacement of material per revolution of a rotary feeder is nearly constant. Thus, during normal operation of a rotary feeder, the volumetric feed rate is nearly a direct ratio of the rate of revolution of the rotor. Further, as long as bulk density remains fairly constant, the feed rate in pounds of material per hour is also a direct ratio. By calculating the volume displaced by the paddles, the volume of material fed per revolution can be determined. By controlling the rate of revolution via a variable speed motor, for example, the volumetric capacity can be controlled. The motor drive shaft is connected to the paddlewheel drive shaft through a speed reducer such as a belt, chain or gear drive. By using a controller similar to the controller described for controlling eccentric motor speed, i.e. an Allen Bradley 1331 Adjustable Frequency Controller Part No. 134960, the operating speed of the drive motor may be controlled.

In operation, a sprocket (not shown) is connected to the shaft of the driven paddle wheel. Magnetic sensor 88 is placed next to the sprocket and generates an electrical pulse each time a tooth of the sprocket passes the sensor. A counter receives the electrical pulses, counts the pulses per time period and generates an output signal. The output signal may be an electrical current which is directly proportional to the RPM of the driven shaft. The output signal is supplied to I/O interface 30, which converts the output signal to a digital signal suitable for processing unit 11. Processing unit 11 compares this digital signal, representing the feed rate, with a desired value stored in memory 12, or to a value that has been input by an operator via input device 14. If the actual operating speed is greater than the stored or operator input value, computer control system 3 generates a signal to reduce the motor drive RPM. If the actual operating speed is less than the stored or operator input value, computer control system 3 generates a signal to increase the speed of the drive motor. If the operating speed coincides with the stored or operator input value, no correction signal is generated.

Figure 6:
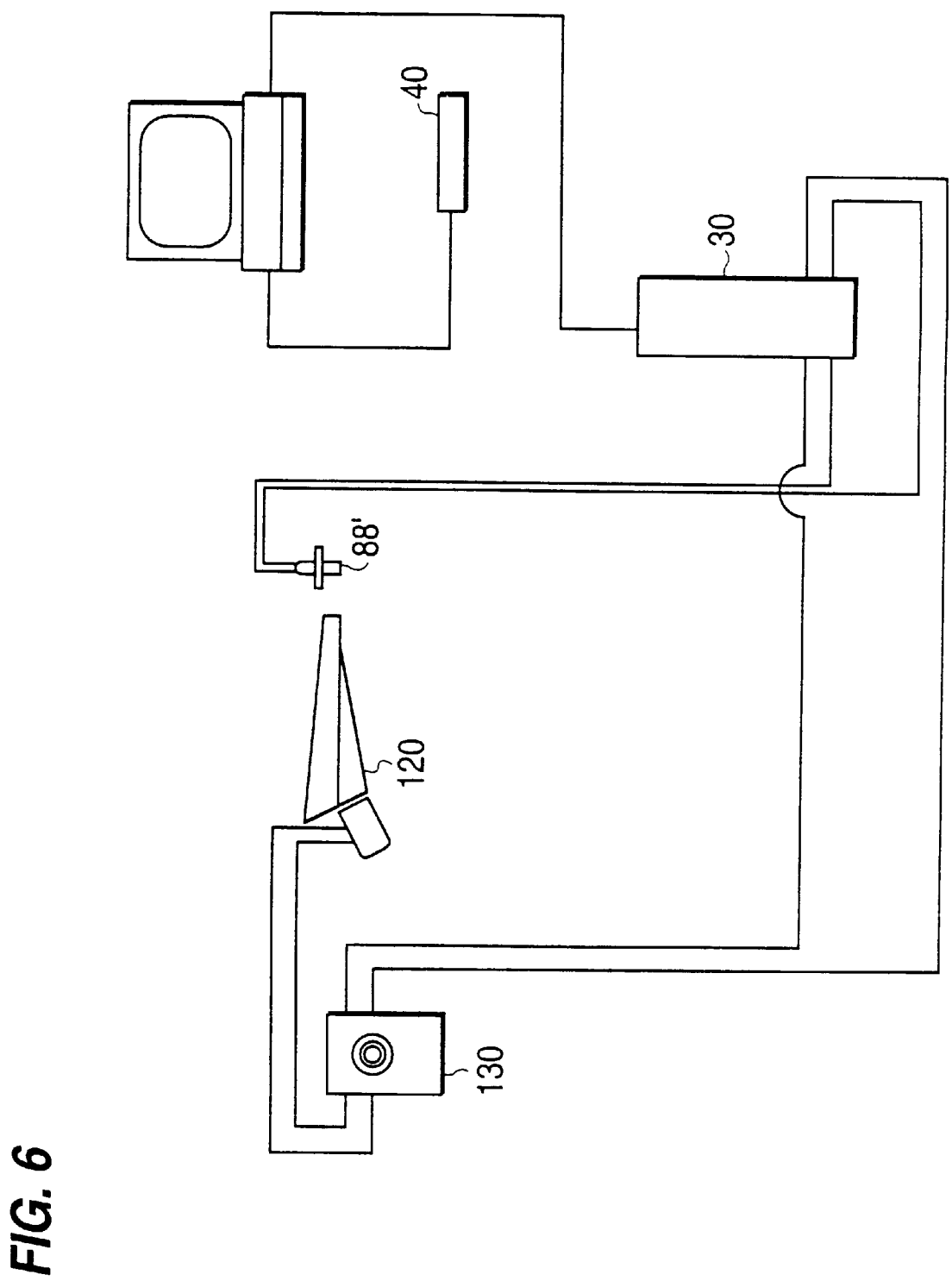
FIG. 6 is a schematic view showing the monitoring and control of another type of feeder according to the present invention.

Referring now to FIG. 6, a sensor 88' may be utilized to sense the feed rate of a vibratory feeder. Vibratory feeder 120 includes a trough or pan which is vibrated by an AC power supply 130. The conveying rate of the feeder can be controlled by varying the frequency or amplitude of the vibrations. AC Power supply 130 receives a control signal. An increase in the current or voltage of the control signal increases the feed rate and a decrease in the current or voltage of the control signal decreases the feed rate. In general, the feed rate of electromagnetic vibratory feeders is nearly a direct ratio to the power supplied by the controller. A suitable controller is the Syntron Controller Model CC1-DC, a fixed frequency, 60 cycle AC source, which supplies a variable voltage to the vibratory feeder.

A feed rate curve relates the RPM of the rotary feeder or the vibration frequency or amplitude of the vibratory feeder to the volumetric feed rate. Since control signals may be utilized to vary the RPM of the rotary feeder or the frequency or amplitude of the vibratory feeder, the feed rate curve determines how changes in the control signal affect feed rate. Although such factors as the natural resonant frequency of the product, the slope of the bottom of the feeder, moisture content, bulk density and angle of repose affect the flow rate of a product, the feed rate curve based on a direct ratio of power supplied to the feeder produces fairly accurate and repeatable results.

Sensors 90 and 92, illustrated in FIGS. 3 and 7, monitor divider knife position and cutout gate position, respectively. Divider knife position controls the division of material flow and directs the flow into proper spouts of the discharge hopper. Cutout gate position controls the amount of material accepted by the blender. Sensors 90 and 92 may be linear transducers, potentiometers, optical position indicators, or ultrasonic position indicators, similar to those discussed above with respect to sensors 84 and 86. Control signals actuate the hydraulic jacks controlling divider knife position and cutout gate position.

FIG. 3 also illustrates input holding bin 50 and output holding bins 52, 54, and 56. The output holding bins may receive heavy, middle, and light discharge from separator 6, respectively. Input holding bin includes high level sensor 60 and low level sensor 70; output holding bin 52 includes high level sensor 62 and low level sensor 72; output holding bin 54 includes high level sensor 64 and low level sensor 74; and output holding bin 56 includes high level sensor 66 and low level sensor 76. These high- and low-level sensors are used to determine upper and lower operating limits on the amount of particulate material in the holding bins. As described in greater detail below, the triggering of high level sensors 62, 64, and 66, indicating that a respective output holding bin is full, may be used to trigger a shutdown of the system. Suitable sensors are proximity sensors available from Bin-D-Cator.

In a first operating mode, in order to set optimal operating parameters for a given separating job, the operator starts the separating device and computer control system. To separate a particular product, the operator presets computer control system 3 to provide an initial setting for the operating parameters of separator device 2. If similar products have been processed before, the preset values can be set to similar values as were used in the previous processing runs, or can be recalled from the computer memory. In this manner, optimal operating parameters for a given product or for desired qualities of an end product for a particular type of separating job may be recalled from memory and be used to control separating device 2 for a similar job. Additionally, computer control system 3 has the capability to store the operating parameter history of a particular job so that a record is kept, and so that the same operating parameters over the entire course of a separating job may be used. If the operator does not know what preset values are required, he may preset control system 3 by selecting mid-range values and adjusting or fine tuning the values as the product is processed.

With the separator device 2 running at a preset value, the operator starts the feed mechanism and sets an initial feed rate. As the system is running, the operator may adjust operating parameters manually, or by entering new preset values directly into computer control system 3 through input device 14. When the operator is satisfied with the quality of product separation, feed rate of incoming product may be increased and further adjustments made, using the computer input device, or using manual controls. After reaching optimum operating capacity and separation quality, the operator may store the value of each operating parameter and set computer control system 3 to maintain those values as presets until the processing run is completed or until a change is desired by the operator.

After separator device 2 is adjusted for optimal separation, cutout gates 602 and divider knives 604 may then be adjusted to accept the maximum amount of product which meets standard qualifications; and adjusted to reject the maximum amount of substandard material. The material between the acceptable product and the rejected product is of middle quality and can then be recycled in some manner.

In another embodiment, the present invention includes a second operating mode in which sensors are utilized to sense product characteristics. The sensed characteristics are the compared with desired characteristics of the final product as stored in memory or input by an operator. In response to this comparison, computer control system 3 adjusts the operating parameters of separator device 2 accordingly. Sensors for sensing particle weight, density, size, shape, color, opacity, texture, capacitive reactance, inductive reactance and magnetism may be utilized. Details of the second operating mode are described with reference to FIG. 8.

Figure 8:
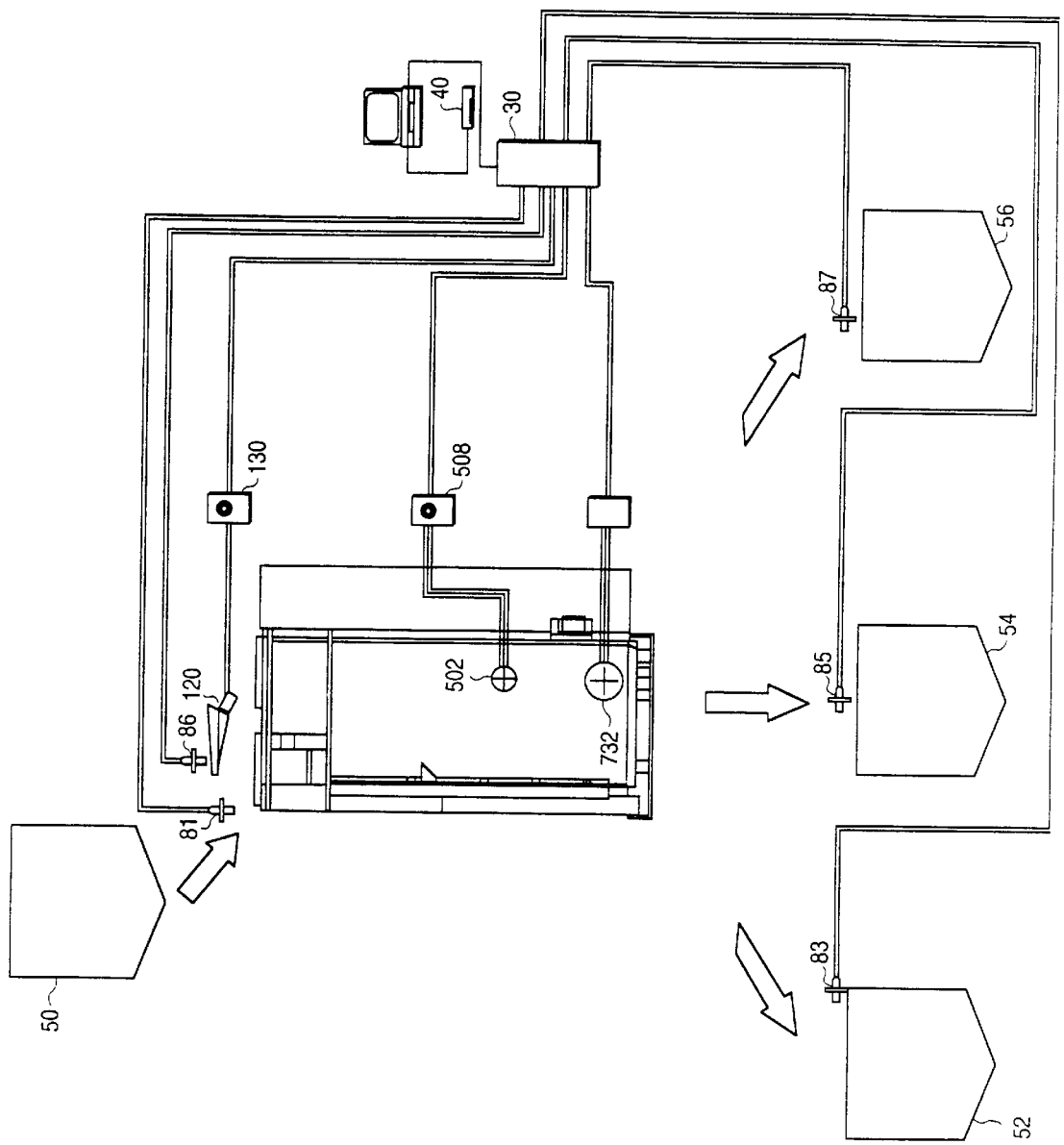
FIG. 8 is a schematic view showing another mode of operation of the computer controlled separator device according to the present invention.
Figure 12A:
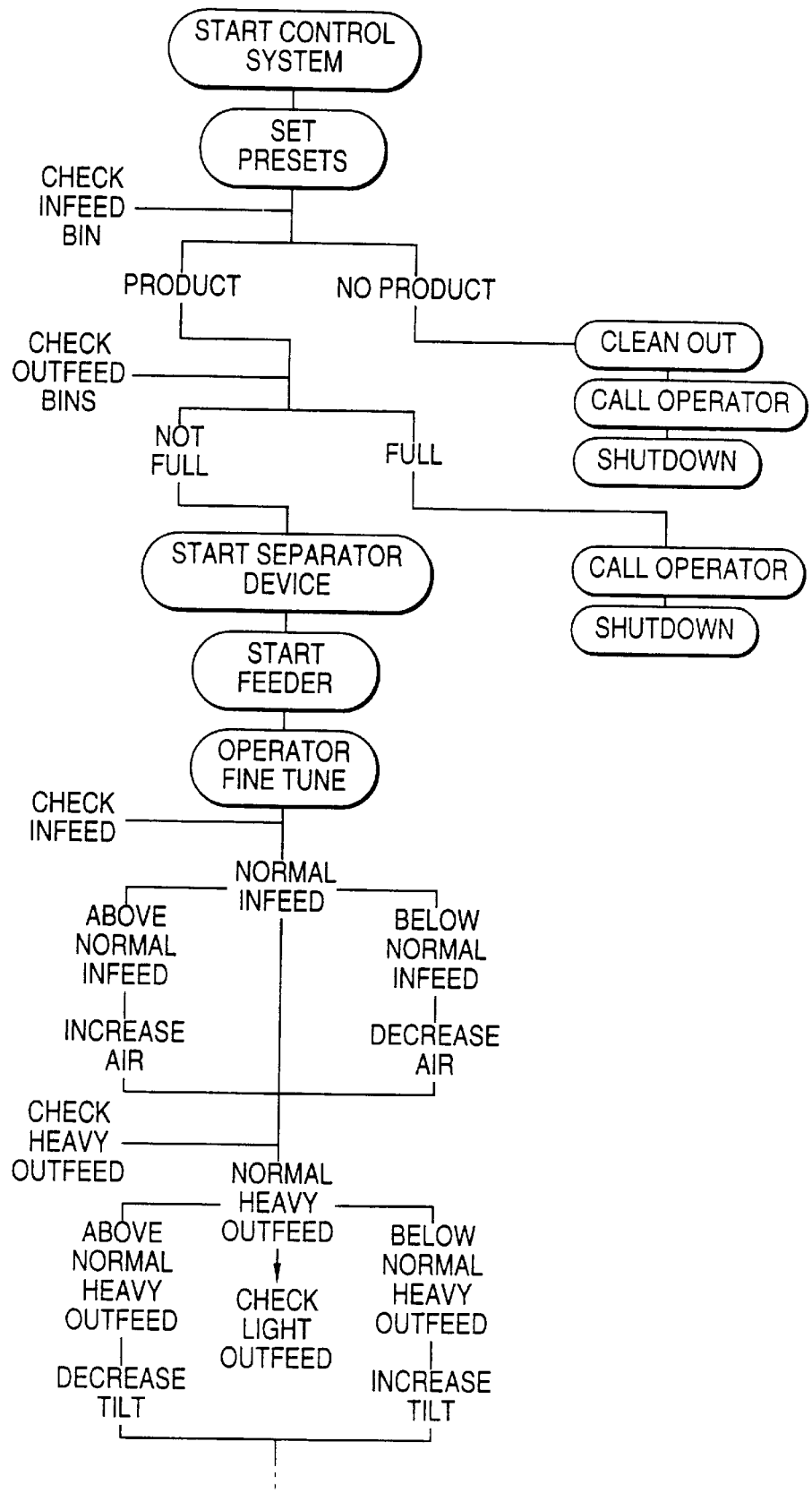
FIGS. 12a, 12b, 12c, 12d, 12e, 12f, 12g, 12h, 12i and 12j are a flow chart illustrating an example of separator device adjustment according to the present invention.
Figure 12B:
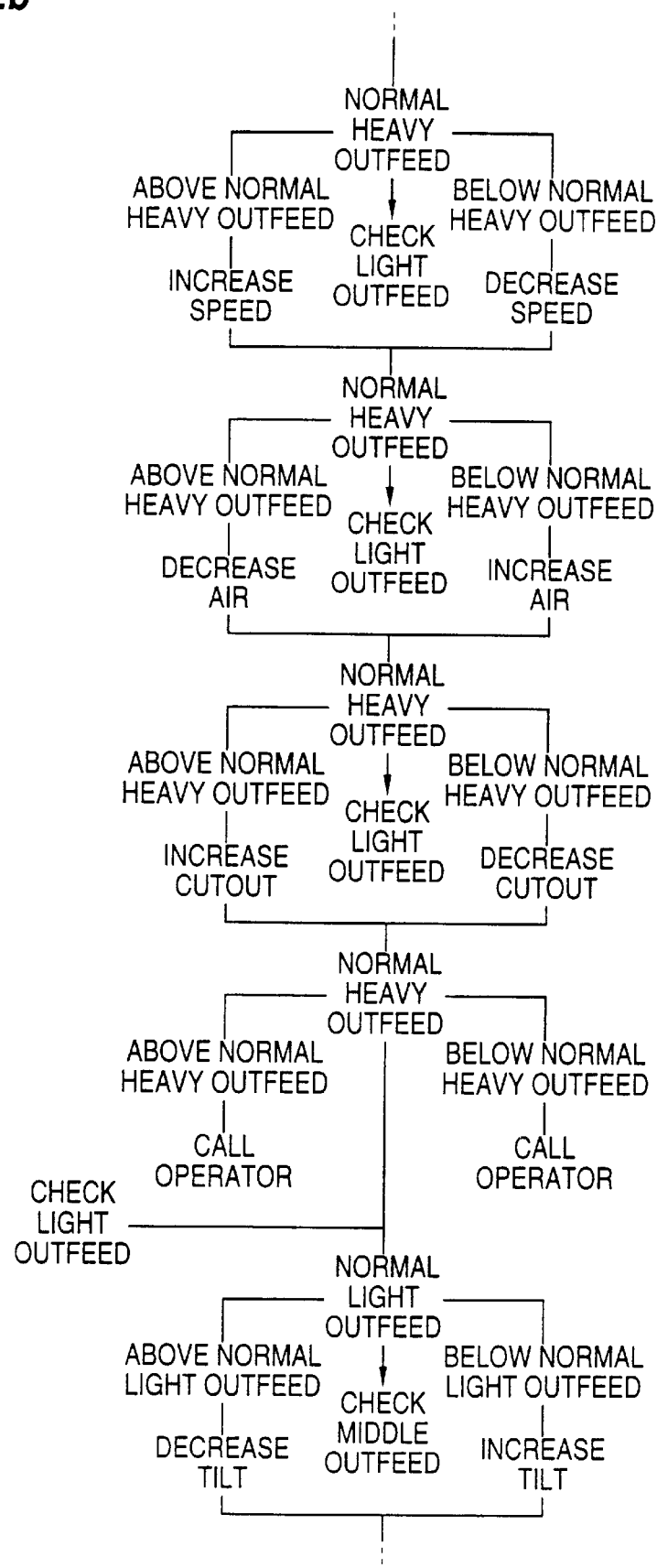
Figure 12C:
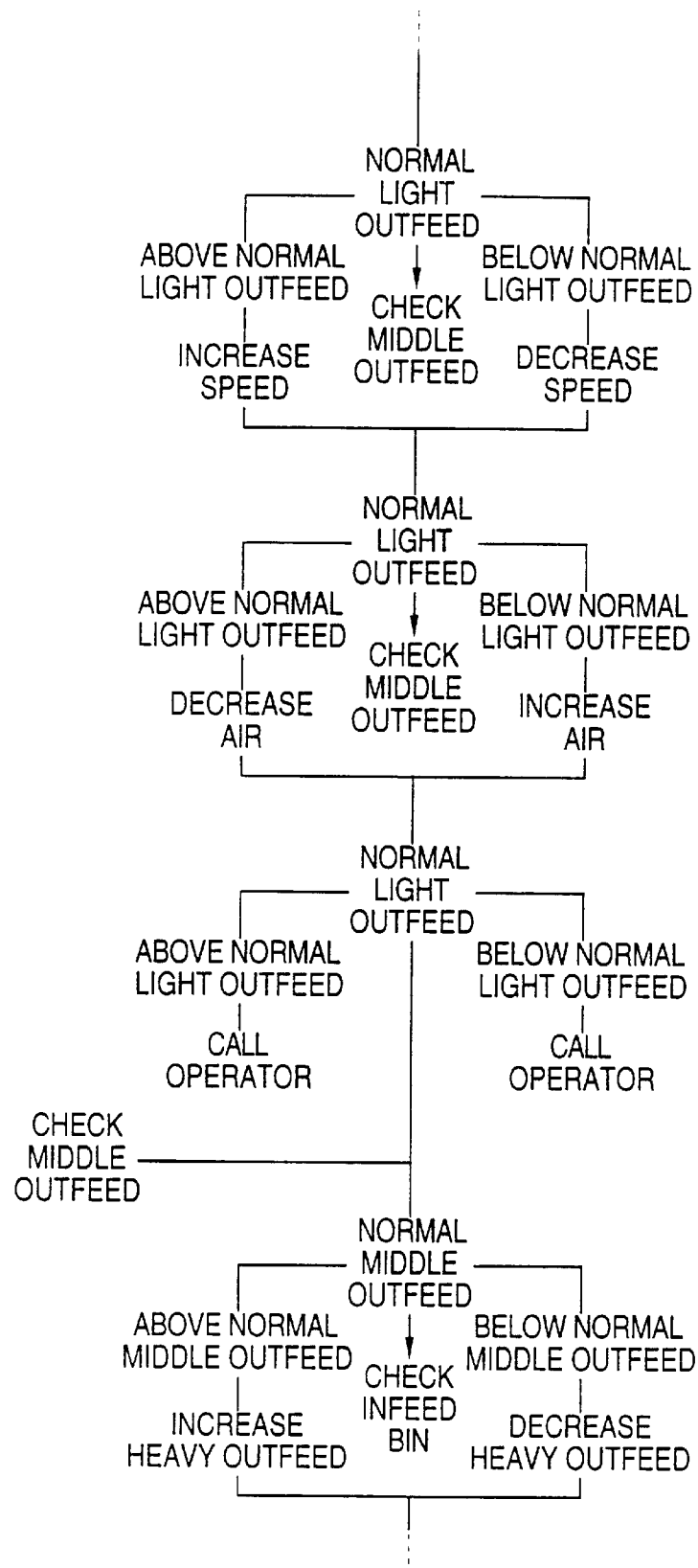
Figure 12D:
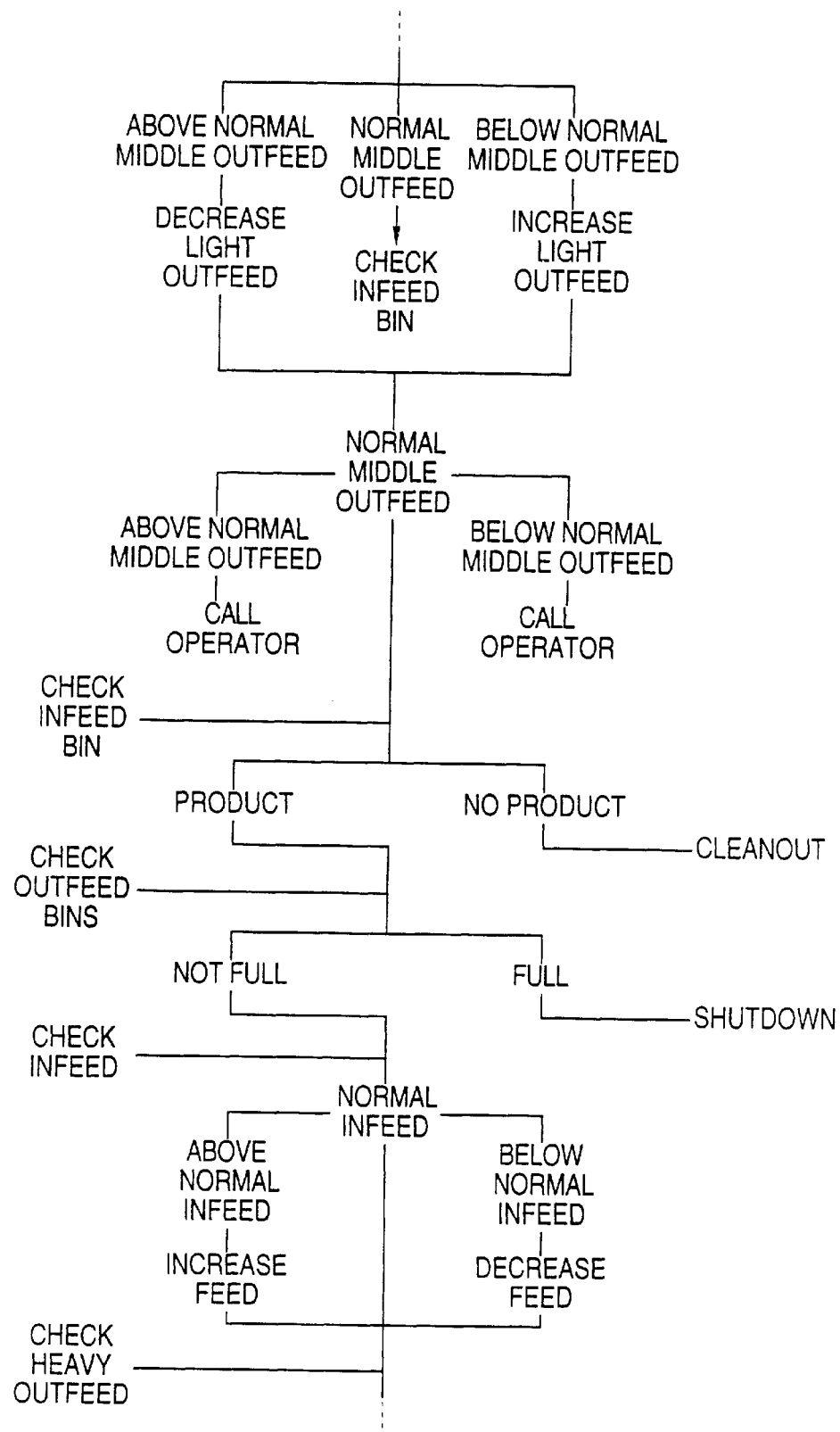
Figure 12E:
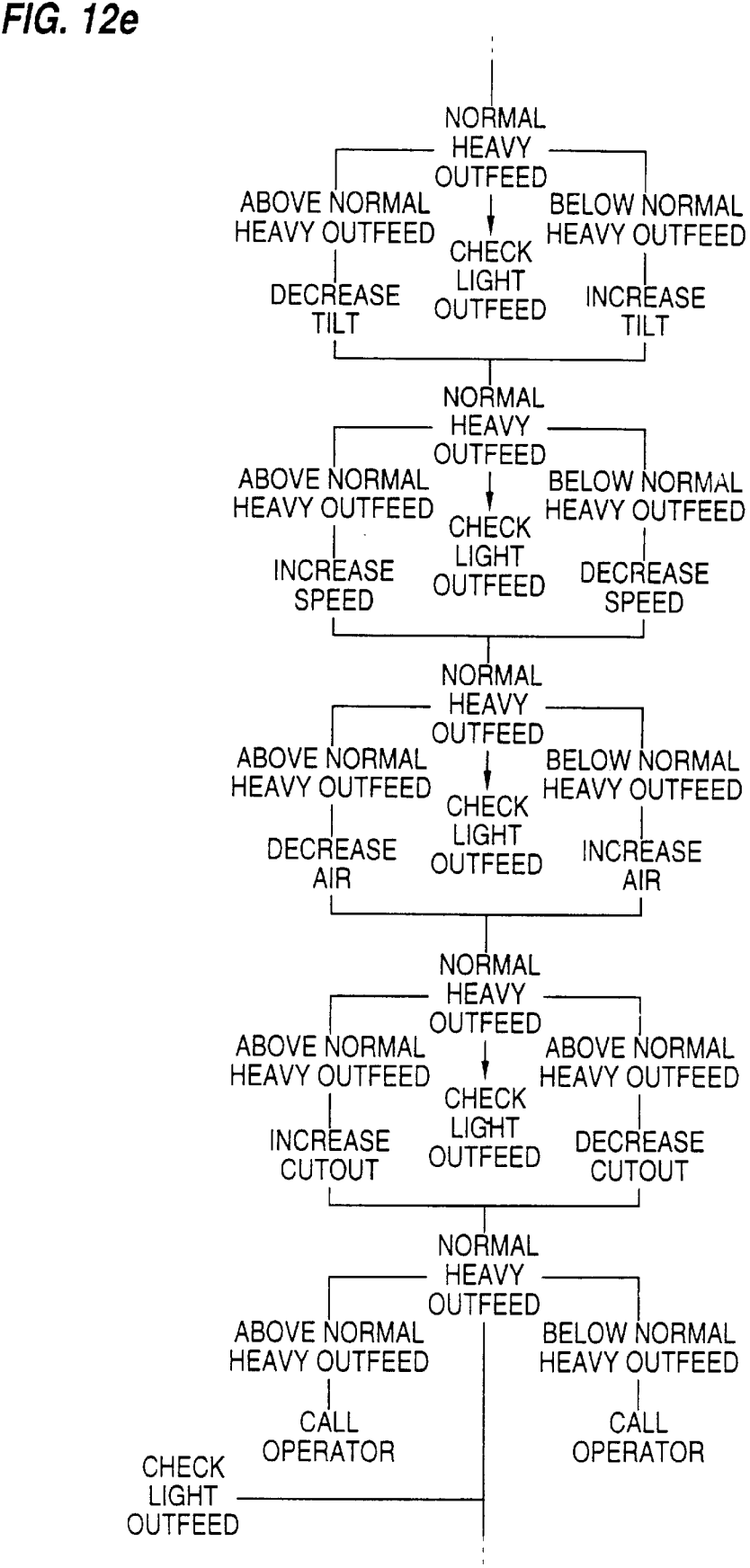
Figure 12F:
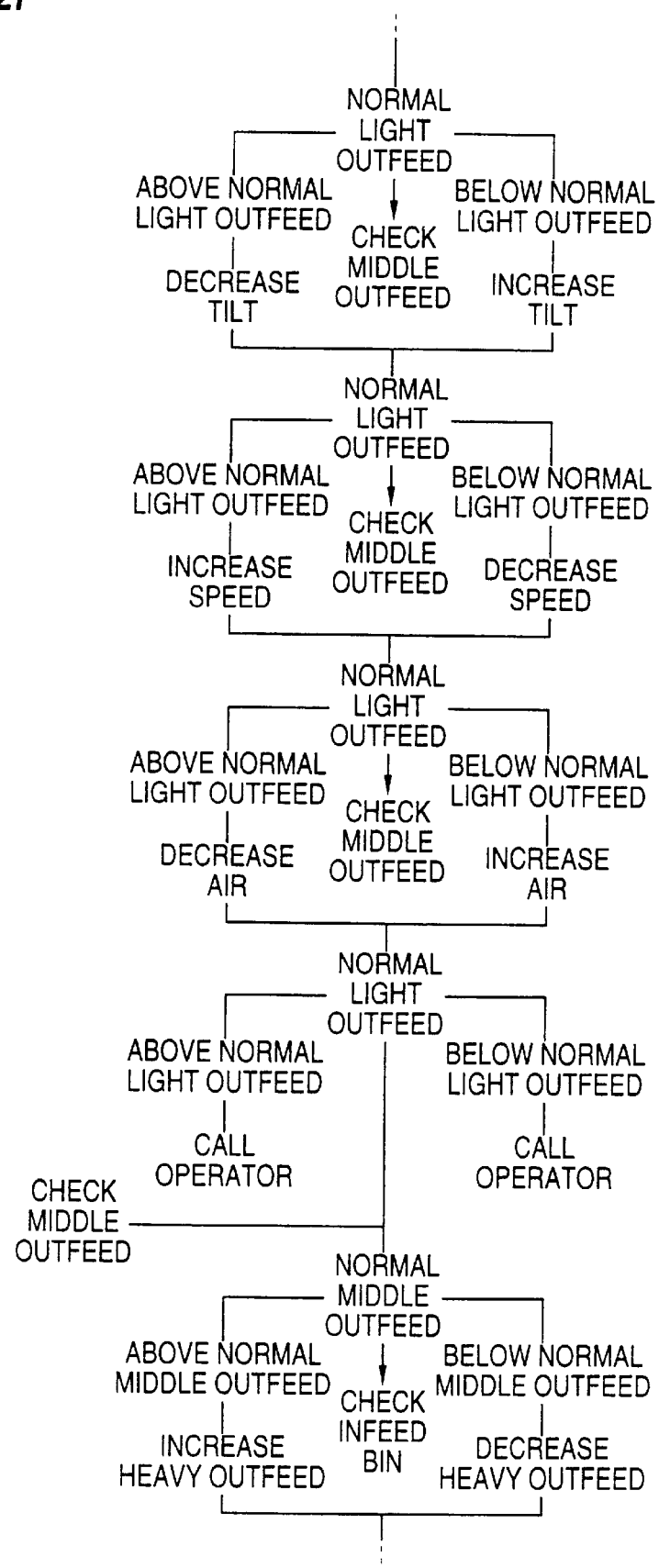
Figure 12G:
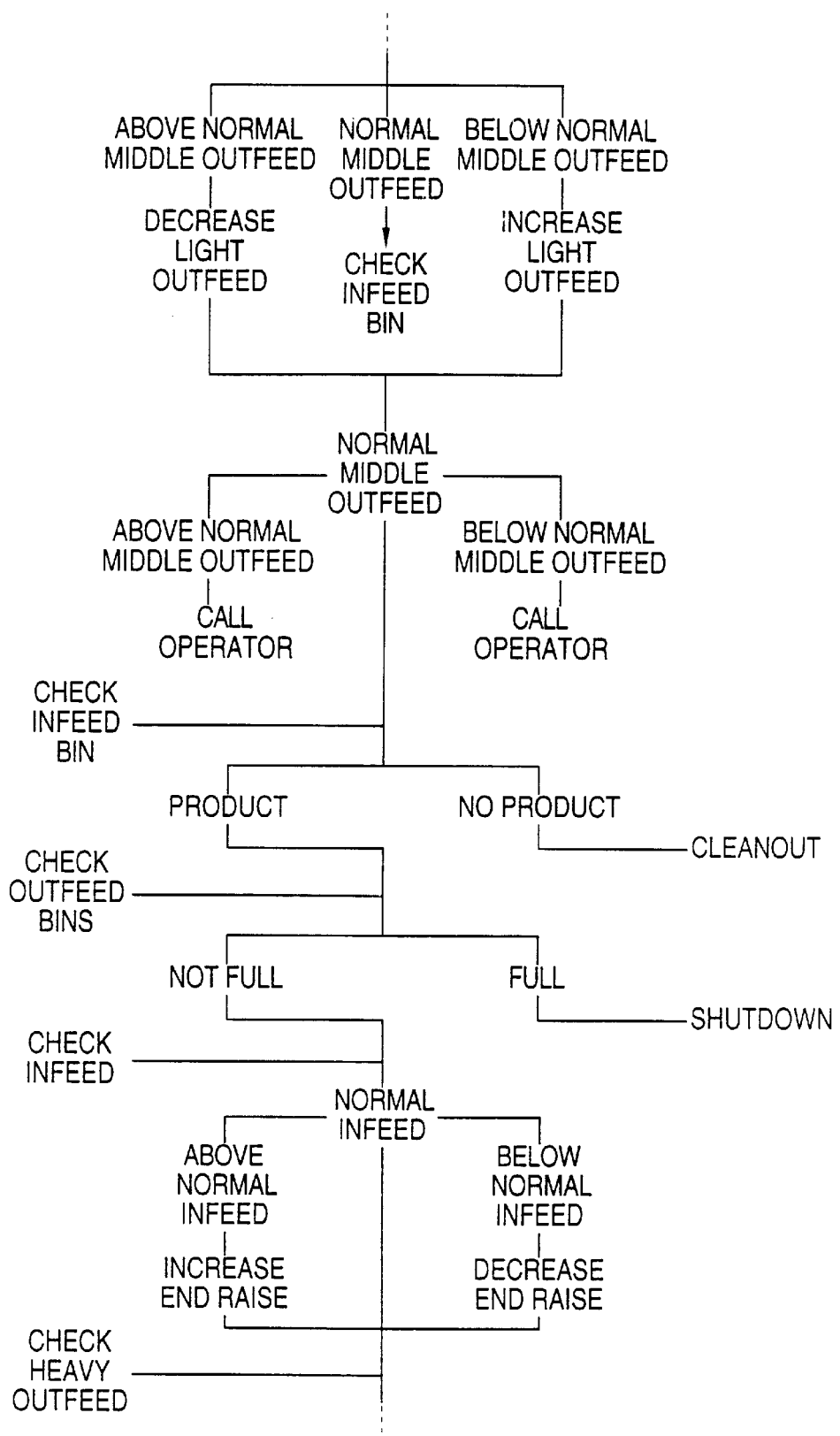
Figure 12H:
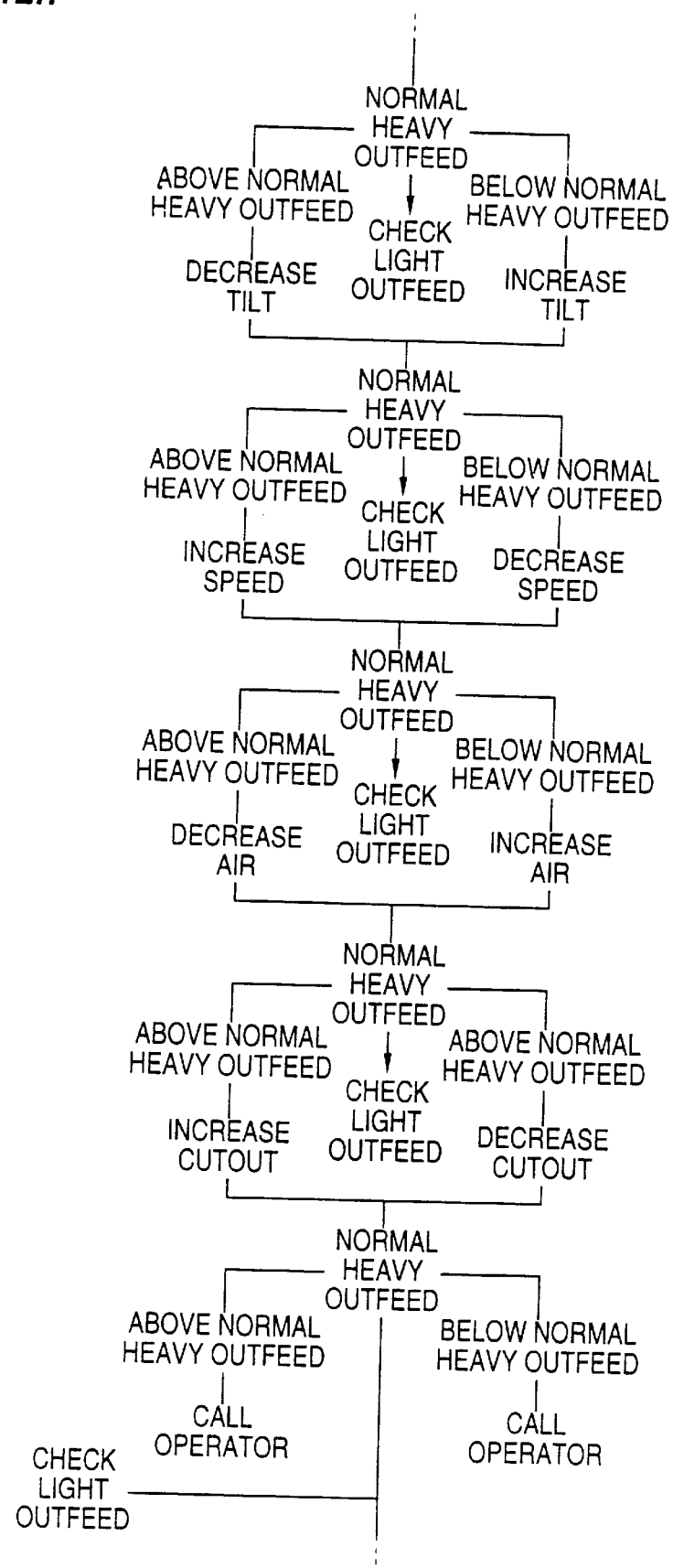
Figure 12I:
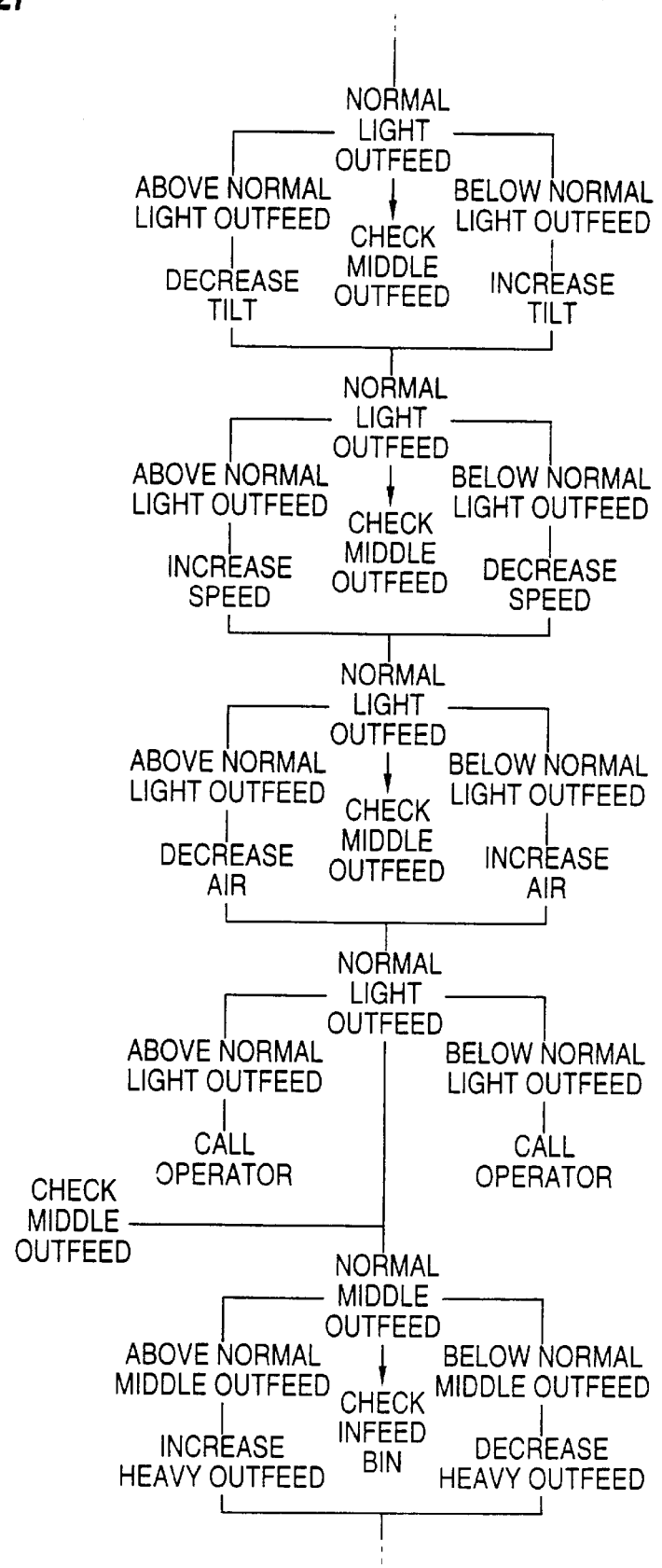
Figure 12J:
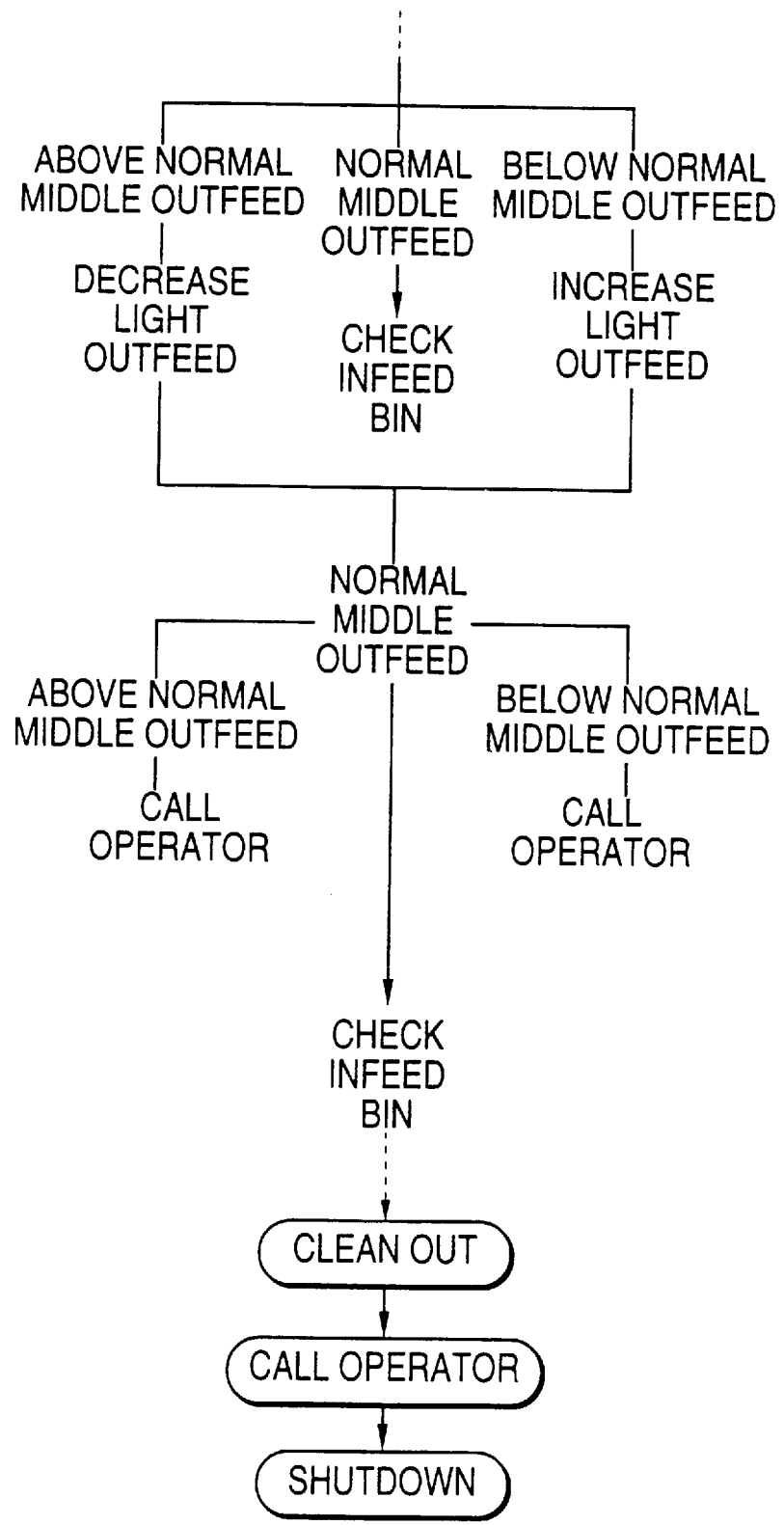

Characteristics of any portion of the product, such as incoming or outgoing product, including the outgoing heavy fraction, middle friction or light fraction, may be sensed in order to control separator device parameters. As can be seen in FIG. 8, product sensor 81 senses characteristics of the incoming product, and product sensors 83, 85 and 87 sense characteristics of the outgoing product heavy fraction, middle fraction and light fraction, respectively. Sensors 81, 83, 85 and 87 generate signals that are supplied to I/O interface 30. I/O interface 30 converts the signals from these sensors to signals suitable for processing unit 11. Processing unit 11 compares the sensed product characteristics to either user input values or to preset values, and generates signals for controlling the separator device parameters in order to achieve the desired product qualities. If user input values are unsatisfactory, the present invention may be programmed to return to preset values in order to obtain optimal separation.

In accordance with one implementation of the present invention, particle weight or density may be sensed, compared with desired weight or density characteristics, and the results of the comparison used to control the operating parameters of the separator device. For example, any one or all of sensors 81, 83, 85 and 87 may measure bulk density. A container of a known volume and having an adjustable opening at its bottom may be suspended and supplied with a strain gauge. Product is fed into the container from a surge bin located above the container. The surge bin is arranged so as to maintain a constant volume of product in the container. The spout of the surge bin is preferably offset and angled, e.g. at 45 degrees, so that there is no direct vertical flow path into the container. The opening in the bottom of the container is adjusted so as to maintain a steady flow of material through the container. As material flows through the container, any change in the bulk density of the material is sensed by a change in weight. Using this method, changes in bulk density of 1–2 percent have been detected. An appropriate signal is output from the stain gage to I/O interface 30 and may be converted into an indication of bulk density by processing unit 11.

Alternatively, different product characteristics, indicative of color, opacity and texture, may be sensed by sensors 81, 83, 85 and 87. One or more of sensors 81, 83, 85 and 87 may be, for example, optical sensors. Using an optical sensor, a light beam is directed onto the material. Reflected light is detected by the light sensor, which generates an output signal proportional to the reflected light. Thus, the separation of material having particles of differing color or shade, such as copper and aluminum particles, can be controlled using signals from light sensors.

Other characteristics, such as capacitive reactance, inductive reactance and magnetism may be measured to determine product quality as well. For example, capacitive reactance position sensors may be used to determine such characteristics as particle size or bulk density. Such a sensor generates a capacitive reactance field within the product being sensed and generates an output signal that is related to the strength of the field. Sensor output is affected by such things as particle size, bulk density and moisture content. If distance between the sensor and particle is kept relatively constant, the sensor will detect a greater field strength from large or dense materials and a lesser field strength from small or light particles. Additionally, material having a high moisture content produces a greater field strength, while low moisture content material produces a lesser field strength. If distance, size and moisture are kept relatively constant, the sensor will detect changes in particle density. If distance, density and moisture are kept constant, the sensor will detect changes in particle size. With a sensor having an operating range of 3 inches and a sensor diameter of 1 ¼ inches, the maximum practical size of particle has been found to be ½ inch diameter. The accuracy and repeatability improves as the particle size decreases and as the size range and particle shape become more uniform. For example, with relatively spherical and uniformly sized particles of ¼ inch diameter, the output of the sensor has been found to be substantially linearly related to particle density. The capacitive sensor may be mounted on a sampling spout with an adjustable outlet attached to the base of a surge bin. Surge bins may be located in the main flow spouts of the incoming feed bins. Output signals from each capacitive sensor may advantageously be averaged over time to allow for minor fluctuations. Suitable sensors are produced by Rechner. An averaged signal is sent to I/O interface 30 and to processing unit 11 to be compared with standard or input values.

Sensors 81, 83, 85 and 87 may sense any combination of the above-mentioned product characteristics. Each additional sensing factor would improve the accuracy of separation. The output of sensors 81, 83, 85 and 87 is supplied to I/O interface 30. I/O interface 30 generates an appropriate signal, which is supplied to processing unit 11. Processing unit 11 compares the sensed characteristics with desired characteristics, which are stored in memory 11 or input by an operator via input device 14. In accordance with the results of the comparison, processing unit 11 generates signals to control separator device operating parameters in order to approximate desired conditions.

An example of separator device operation parameter adjustment is shown in FIGS. 9–11. FIG. 9 represents a truth table for separator device adjustment when sensor 88 indicates no change in the quality of the infeed product. Quality of the infeed product is determined by a variety of factors, for example, variations within the product itself, variations due to storage conditions and variations in handling. In the next three columns of the table, sensor input for heavy outfeed, middle outfeed and light outfeed is respectively indicated. A "+" in these three columns indicates a positive change detected by the sensor associated with the appropriate product outfeed and input to the control system. A "−" in these three columns indicates a negative change detected by the sensor associated with the appropriate product outfeed and input to the control system. The product outfeed sensors detect characteristics of the outfeed that are indicative of product quality. If, for example, that characteristic is particle size, the sensor associated with the middle outfeed would detect the size of the particle.

The remaining columns of the table show the computer output to adjust separator device parameters in response to the sensor input. The adjustments relate to opening and closing of cutout gates, movement of divider knives to adjust the discharge of heavy, middle and light fractions of separated material, altering the feed rate, altering the end raise of the deck, altering the side tilt of the deck, altering the vibration speed of the deck, and altering the air flow from respective of a plurality of fans. The adjustments would be made after specified time intervals and would be made sequentially as explained with reference to FIGS. 12a–12j below. "+" in these columns indicates an increase in the adjustment of the separator device parameter, i.e. an increase in cutout gate opening, amount of heavy, middle and light fractions discharged, slope of end raise, side tilt, speed and air flow. A "−" in these columns indicates a decrease in the adjustment of the separator device parameter, i.e. a decrease in cutout gate opening, amount of heavy, middle and light fractions discharged, end raise, side tilt, speed and air flow. In the column labelled middle fraction, a "+−" indicates an increase in the amount of heavy fraction discharged and a decrease in the amount of light fraction discharged; a "−+" indicates a decrease in the amount of heavy fraction discharged and an increase in the amount of light fraction discharged. Finally, "++" and "−−" respectively indicate increase and decrease in both heavy and light fractions. FIGS. 10 and 11 set forth truth tables for the case of increasing feed and decreasing feed, respectively.

While FIGS. 3 and 8 conveniently illustrate two modes of operation of the present invention, it is to be understood that the present invention is intended to encompass both modes of operation, so that in the preferred embodiment, both modes of operation are incorporated. Thus, in the preferred embodiment of the present invention, computer control system 3 controls separator device 2 in response to input from all or any combination of the sensors shown in FIGS. 3 and 8, depending upon the desired control conditions of the user.

The automatic start/stop of the control system of the present invention will now be described. Referring to FIG. 3, material fed into separator system 2 from infeed holding bin 50 is separated and eventually collected in holding bins 52, 54 and 56. Holding bins 52, 54 and 56 respectively receive heavy, middle and light fractions of material separated by separator 6. High level sensors 60, 62, 64 and 66 are positioned in holding bins 50, 52, 54 and 56 to sense when a maximum fill level is reached in a holding bin. Low level sensors 70, 72, 74 and 76 are positioned in holding bins 50, 52, 54 and 56 to sense when a minimum fill level is reached in a holding bin. In a typical operation, the operator activates computer control system 3. Computer control system 3 checks the input from the various bin sensors. If infeed holding bin 50 contains above the minimum level of material, as determined by low level sensor 70; and if holding bins 52, 54 and 56 have below the maximum level of material, as determined by high level sensors 62, 64 and 66, then the separator system may be turned on. A signal from processing unit 11 is supplied to I/O interface 30, which converts the signal to an output suitable to energize separator system. For example, I/O interface 30 may output a 110 volt AC signal to a main switch relay (not shown), which activates a solenoid (not shown) to energize the main drive circuitry (not shown) of separator system.

As soon as the main drive is energized and up to speed, computer control system 3 checks the inputs from the various sensors, compares their values to preset values and sends output correction signals as needed. Computer control system 3 continues to compare inputs with preset or user input values and makes corrections for as long as the main drive circuitry is energized. Meanwhile, computer control system 3 continues to check the high and low levels in the various holding bins. If the feed bin falls below the minimum level as determined by the low level sensor, or if one of the receiving bins rises above the maximum as determined by the high level switch the machine is shut off. To shut off, computer control system 3 sends a signal to I/O interface 30 to de-energize the main drive circuitry (not shown). I/O interface 30 no longer supplies an output signal to the relay (not shown), the solenoid (not shown) is deactivated and the main drive circuitry is shut down. Computer control system 3 does not send any correction signals for machine operation during the period when the machine is shut down. For final cleanout, when the last of a product is run, the automatic shutoff may be overridden and all the product allowed to flow from the machine and the holding bins.

FIGS. 12a–12j are a flow chart showing an example of the separator device adjustment that may be accomplished using the computer controlled separator device of the present invention. Beginning with FIG. 12a, an operator starts computer control system 3 and enters preset values. Next, computer control system 3 checks the level of infeed bin via sensor 70. If the level of the infeed product is below sensor 70, computer control system 3 initiates cleanout of the separator device, alerts the operator and shuts down the separator device. If the level of the product is above the level of sensor 70, computer control system 3 checks outfeed bins 52, 54 and 56. If any of the outfeed bins is full, as indicated by sensors 62, 64 and 66, computer control system 3 alerts the operator and initiates shutdown of the separator device. If the outfeed bins are not full, either the operator or computer control system 3 energizes feeder 120 of the separator device. Here, the operator may fine tune separator device parameters. Computer control system 3 checks the infeed product via sensor 81/88, and will either increase or decrease air flow to adjust for the infeed.

Computer control system 3 then checks a characteristic of the outgoing heavy product via sensor 83. In response to signals from sensor 83, the computer control system 3 either increases or decreases end raise, side tilt, vibration speed, air flow, divider knife position and cutout gate position of separator device 2 accordingly. When sensor 83 indicates that the outgoing heavy product has achieved a desired condition, computer control system 3 checks outgoing light product via sensor 87. If the control system is unable to achieve or maintain a desired condition of outgoing heavy product, the operator is alerted.

Similarly, in response to signals from sensor 87, computer control system 3 will increase or decrease end raise, side tilt, vibration speed and air flow until a desired condition of outgoing light product is achieved. If a desired condition is achieved, computer control system 3 checks outgoing middle product via sensor 85. If it is not achieved, computer control system 3 alerts the operator.

Computer control system 3 then checks outgoing middle product via sensor 85. If the characteristic of middle product is above normal or below normal, computer control system 3 will follow the steps necessary to increase or decrease heavy and light products accordingly. If the middle product is a desired condition, infeed bin is then checked via sensor 70. Again, if the computer control system is unable to achieve or maintain a desired condition of outgoing middle product, the operator will be alerted. As shown in FIGS. 12a–12j, this process is repeated until the infeed bin is empty, and the separator device is cleaned out.

All machine operational adjustments including end raise, side tilt, vibration speed, air flow, divider knife position and cutout gate position may be accomplished through the use of hydraulics. The control adjustments may be accomplished without stopping the machine. The prime mover for the hydraulic system is a pump - motor combination (FIG. 7) which delivers all hydraulic fluid necessary to operate the controls in a conventional manner. From the pump, the hydraulic fluid may be controlled to each function independently. Actual movement of the control variables is accomplished by means of hydraulic valves 94 which open and close upon command from the I/O interface 30. The control of the present invention may be continuous or intermittent. The movement may also be accomplished by actuation of manual valves 96. The particular settings of feed rate, end raise, vibration speed, side tilt, air flow, divider knife position and cutout gate position to obtain proper separation for a specific particulate material are controlled and monitored using the control system of the, present invention. The computer control system may also alert the operator with visual or audible alarms to indicate separator device or computer system conditions. For example, if preset values for the device parameters are not maintained, or if the system automatically shuts down.

According to a further aspect of the present invention, computer control system 3 can be readily adapted for networking applications and can be interfaced with additional computers or programmable linear controllers (PLCs) to control operations in other parts of a processing plant. The computer control system of the present invention may be adapted to control several separator devices or other equipment, including an entire processing line. For example, signals from bin level sensors may be used to control the operation of equipment preceding the separator device in a processing line of equipment, such as a screen sizing machine, or to control equipment following the separator device in a processing line of equipment, such as a packaging or bagging machine.

Although the computer control system of the present invention has been described for use with the gravity separator device detailed above, it may be readily understood by those of ordinary skill that the control system of the present invention can easily be adapted to other particulate separator devices, such as the Oliver Maxi-Cap series types or the Oliver Maxi-Cap series stoner, and the like. In particular, all manner of separator devices and the like may be automated using the concepts embraced by the present invention. For example, the computer control system and sensors described herein with respect to the separator device may be readily adaptable to control other devices for processing particulate material, such as screening machines, aspirators, grinders, spiral separators and the like. Thus, the foregoing description is for illustrative purposes only. Changes may be made, obvious to one of ordinary skill in the art, particularly in regard to size, shape, and arrangement of parts, within the scope of the invention as determined by the broad, general terms in which the appended claims are expressed.

I claim:

1. A computer control system for a separator device for separating and outputting an input particulate product, comprising:
    an input device for inputting values representing desired product characteristics;
    a first sensing device for sensing a first actual product characteristic of said input and/or an output product being separated and for generating at least a first product characteristic signal in response thereto;
    a second sensing device for sensing a second actual product characteristic of said input and/or an output product being separated and for generating at least a second product characteristic signal in response thereto;
    a comparison device for comparing said first product characteristic signal with said input values and for generating at least a first control signal in response thereto, and for comparing said second product characteristic signal with said input values and for generating at least a second control signal in response thereto; and
    an adjustment device for adjusting a first operating parameter of said separator device in accordance with said first control signal and a second adjustment device for adjusting a second operating parameter of said separator device in accordance with said second control signal in order to maintain said desired product characteristics.

2. The computer control system according to claim 1, wherein said operating parameters comprise at least one of air flow, separator bed vibration speed, separator bed side tilt, separator bed end raise, feed rate, divider knife position and cutout gate position.

3. The computer control system according to claim 1, wherein said product characteristics comprise at least one of particle weight, density, size, shape, color, opacity, texture, capacitive reactance, inductive reactance or magnetism.

4. The computer control system according to claim 1, further comprising indicator means for indicating to an operator when desired product characteristics are not maintained.

5. The computer control system according to claim 1, further comprising storage means for storing said input values for future reference.

6. The computer control system according to claim 1, further comprising recording means for providing a record of the operating parameters and product characteristics of said separator device.

7. The computer control system according to claim 1, further comprising display means for displaying current product characteristics and operating parameters.

8. The computer control system according to claim 1, further comprising automatic stop means for shutting down operation of said separator device when the amount of separated material reaches a predetermined level.

9. The computer control system according to claim 1, further comprising interface means for interfacing said computer control system with at least one other particulate material processing device.

10. A method of separating particulate material using a computer controlled separator device for separating and outputting an input particulate product, comprising the steps of:

inputting values representing desired product characteristics;

sensing a first actual product characteristic of said input and/or an output product being separated and generating at least a first product characteristic signal in response thereto;

sensing a second actual product characteristic of said input and/or said output product being separated and generating at least a second product characteristic signal in response thereto;

comparing said first and second product characteristic signals with said input values and generating first and second control signals in response thereto; and adjusting operating parameters of said separator device in accordance with said first and second control signals in order to maintain said desired product characteristics.

11. The method according to claim 10, wherein said operating parameters comprise at least one of air flow, separator bed vibration speed, separator bed side tilt, separator bed end raise, feed rate, divider knife position and cutout gate position.

12. The method according to claim 10, wherein said product characteristics comprise at least one of particle weight, density, size, shape, color, opacity, texture, capacitive reactance, inductive reactance or magnetism.

13. The method according to claim 10, further comprising the step of indicating to an operator when desired product characteristics are not maintained.

14. The method according to claim 10, further comprising the step of storing said input values for future reference.

15. The method according to claim 10, further comprising the step of providing a record of the operating parameters and product characteristics of said separator device.

16. The method according to claim 10, further comprising the step of displaying current product characteristics and operating parameters.

17. The method according to claim 10, further comprising the step of shutting down of said separator device when the amount of separated material reaches a ed level.

18. The method according to claim 10, further comprising the step of interfacing said controlled separator device with at least one other particulate material processing device.

19. The computer control system according to claim 7, at least one of said first or said second sensing device for sensing actual product characteristics and for generating product characteristic signals correctly generates product characteristic signals in either the presence or absence of input impurities.

20. The method according to claim 10, wherein said sensing step correctly generates product characteristic signals in either the presence or absence of input impurities.

21. An automated gravity separator device comprising:

a gravity separation table for separating input materials including an adjustment device for adjusting actual operating parameters of said separator device:

an input device for inputting values representing desired product characteristics;

a first sensing device for sensing a first actual product characteristic of said input and/or an output product being separated and for generating a first product characteristic signal in response thereto;

a second sensing device for sensing a second actual product characteristic of said input and/or said output product being separated and for generating a second product characteristic signal in response thereto;

a comparison device for comparing the first and second product characteristic signals with the input values and for generating first and second control signals in response thereto; and said adjustment device adjusting the actual operating parameters of said separator device in accordance with the first and second control signals in order to achieve or maintain said desired product characteristics.

* * * * *

UNITED STATES PATENT AND TRADEMARK OFFICE
CERTIFICATE OF CORRECTION

PATENT NO.: 5,943,231

DATED: August 24, 1999

INVENTOR(S): James A. Thomas

It is certified that an error appears in the above-identified patent and that said Letters Patent is hereby corrected as shown below:

In claim 17, line 15:

Delete "ed" and insert --predetermined--.

Signed and Sealed this

Sixteenth Day of May, 2000

Attest:

Q. TODD DICKINSON

Attesting Officer

Director of Patents and Trademarks